June 7, 1932.  G. F. WITTUM  1,862,072
CALCULATING MACHINE
Original Filed Dec. 12, 1923  7 Sheets-Sheet 1
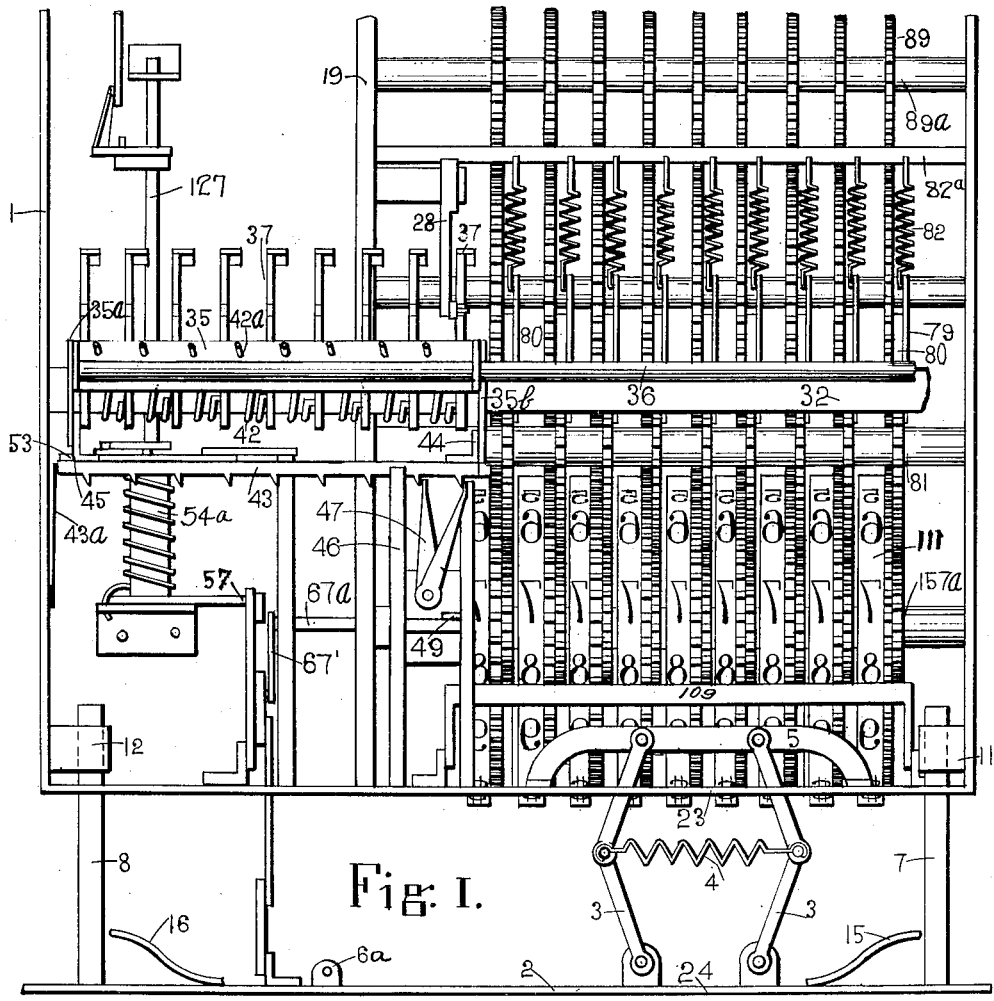

June 7, 1932.    G. F. WITTUM    1,862,072
CALCULATING MACHINE
Original Filed Dec. 12, 1923    7 Sheets-Sheet 2
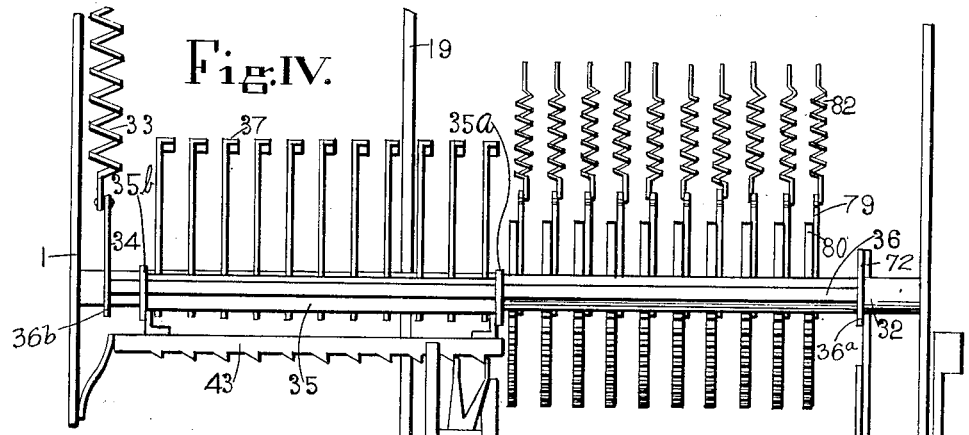
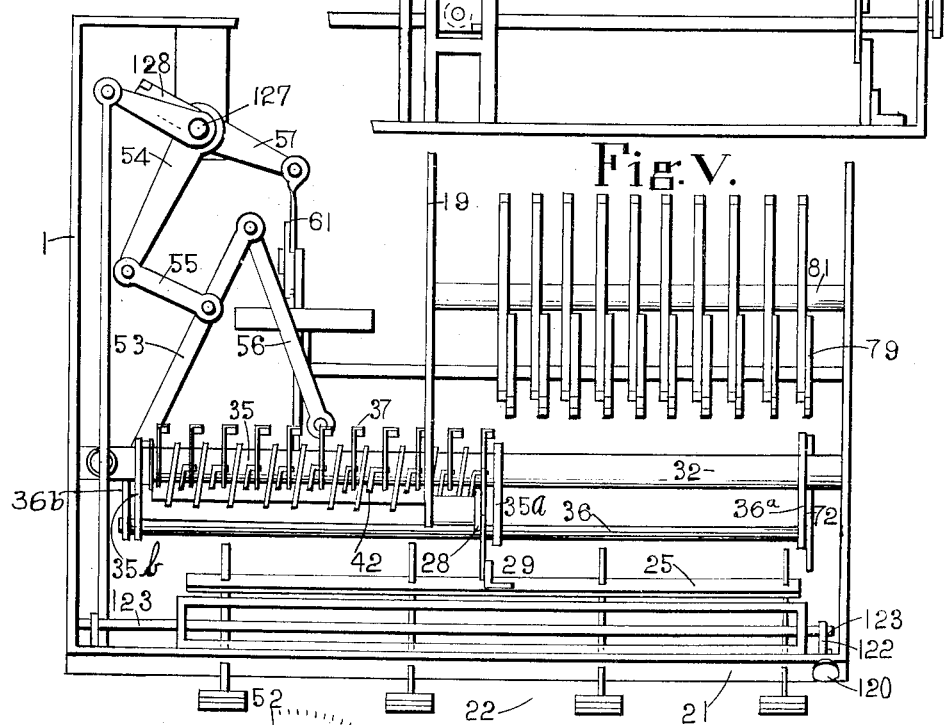
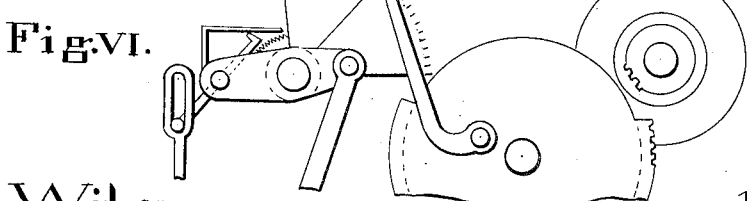
Witnesses:
Gladys R. Darling
Susan K. O'Connor
Inventor.
Geo. F. Wittum.

June 7, 1932.  G. F. WITTUM  1,862,072
CALCULATING MACHINE
Original Filed Dec. 12, 1923   7 Sheets-Sheet 3
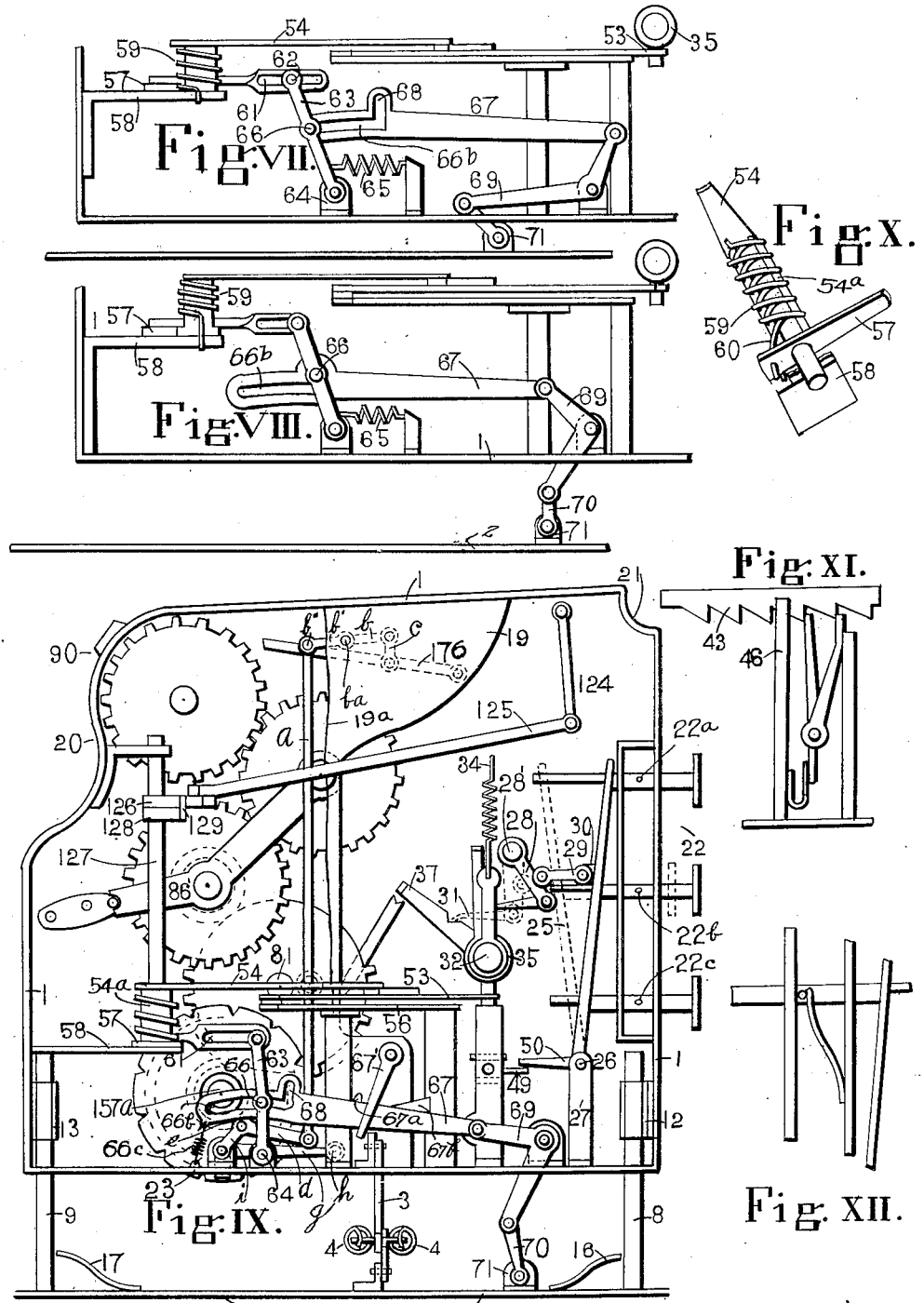
Witnesses:
Gladys R. Darling
Susan K. O'Connor
Inventor.
Geo. F. Wittum June 7, 1932.  G. F. WITTUM  1,862,072
CALCULATING MACHINE
Original Filed Dec. 12, 1923  7 Sheets-Sheet 4
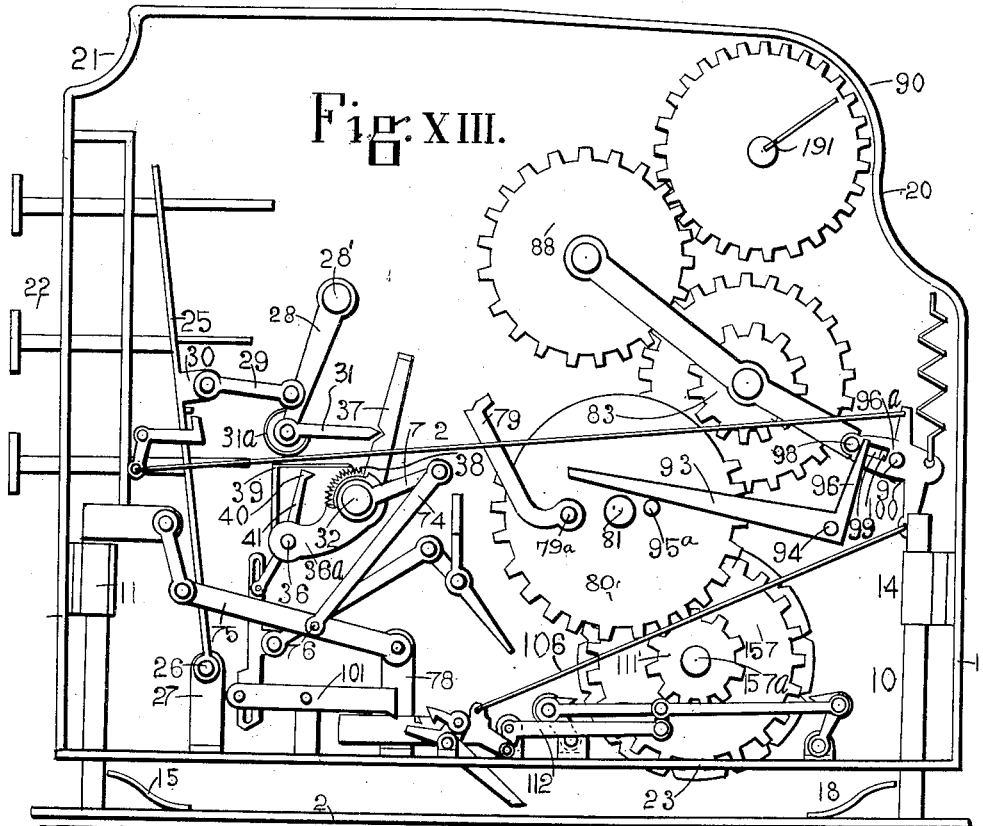
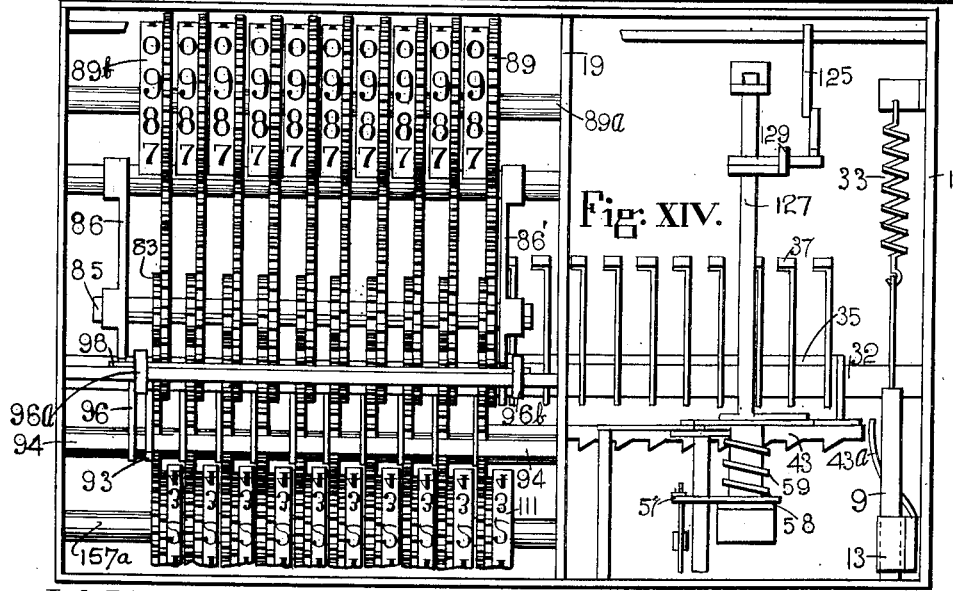
Witnesses:
Gladys R. Darling
Susan G. O'Connor
Inventor.
Geo. F. Wittum June 7, 1932. G. F. WITTUM 1,862,072
CALCULATING MACHINE
Original Filed Dec. 12, 1923 7 Sheets-Sheet 5
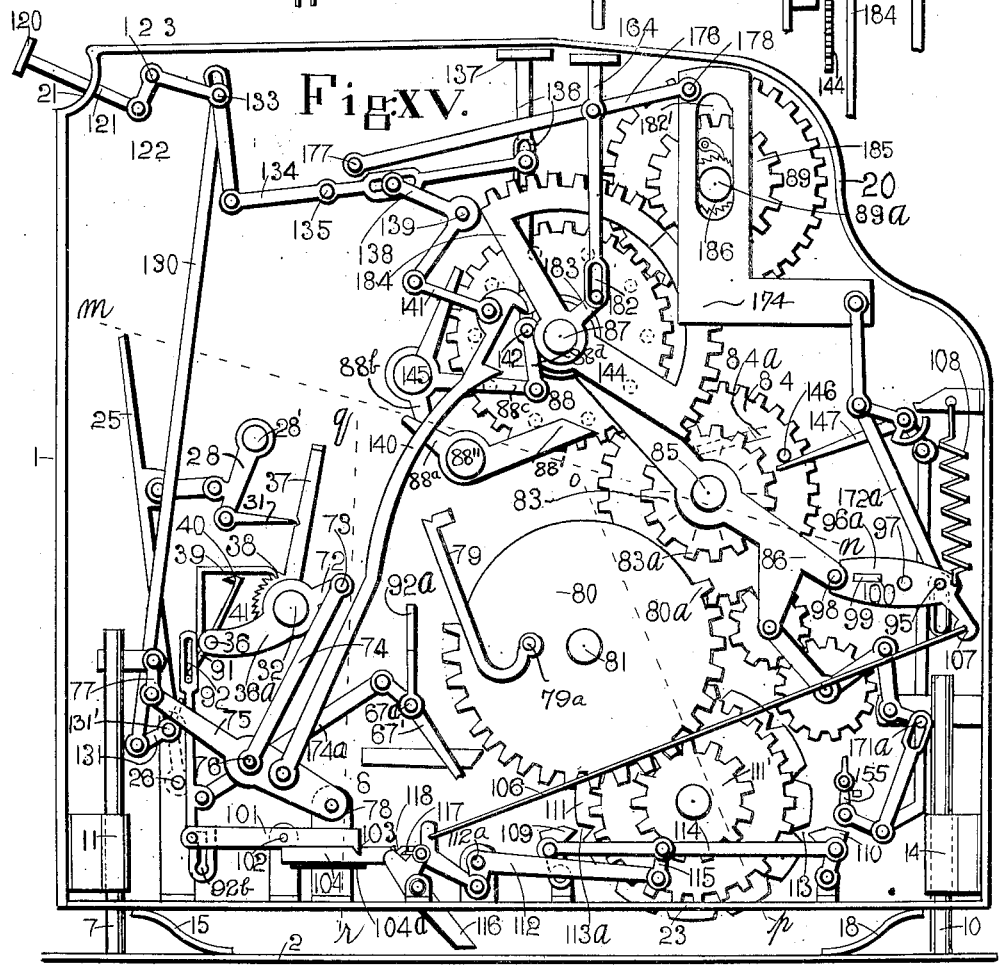
Witnesses:
Gladys R. Darling
Susan G. O'Connor
Inventor.
Geo. F. Wittum

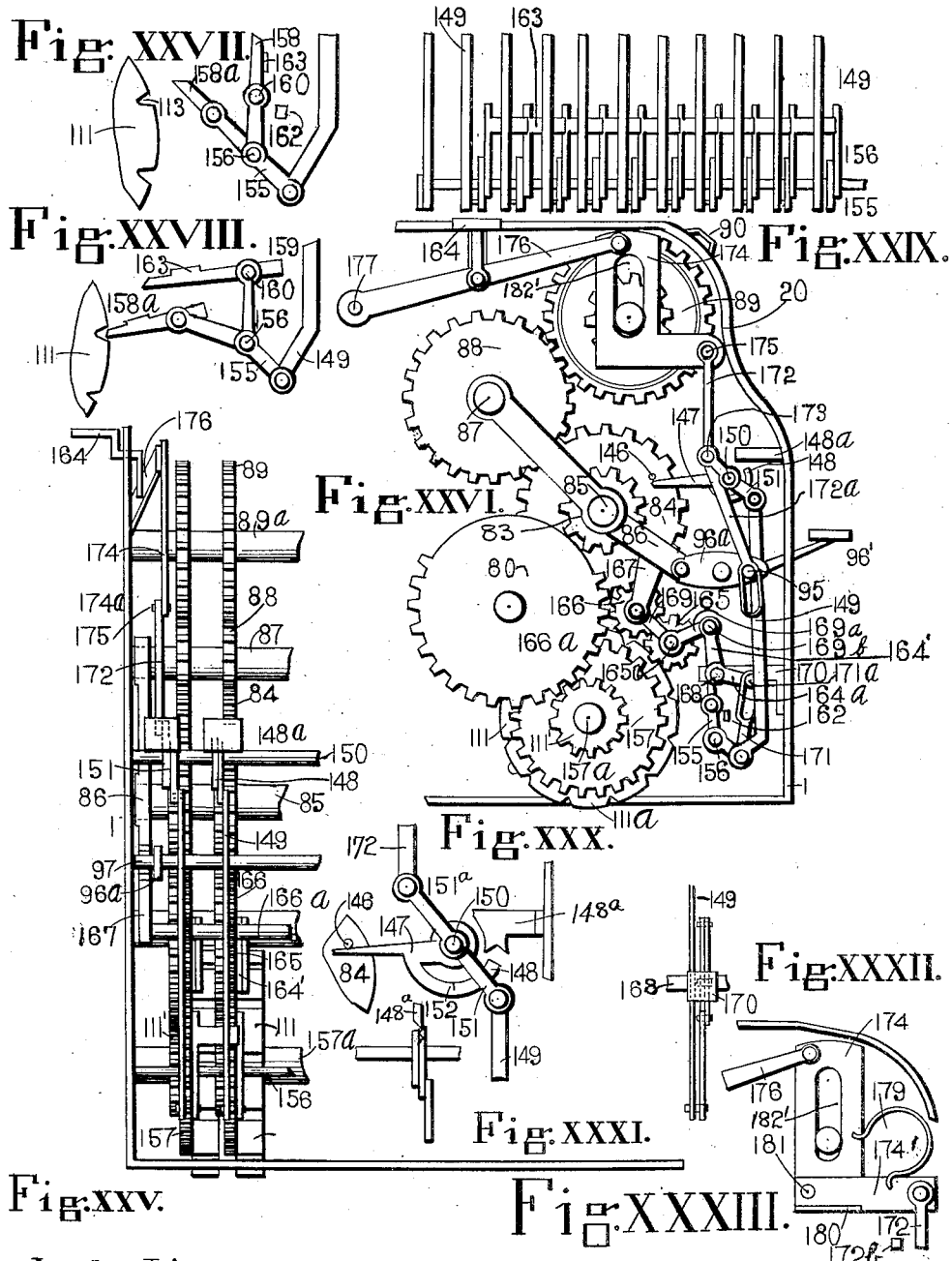

June 7, 1932.  G. F. WITTUM  1,862,072
CALCULATING MACHINE
Original Filed Dec. 12, 1923   7 Sheets-Sheet 7
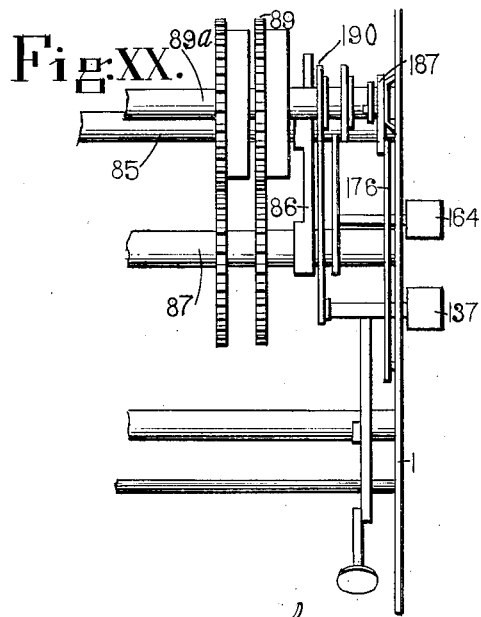
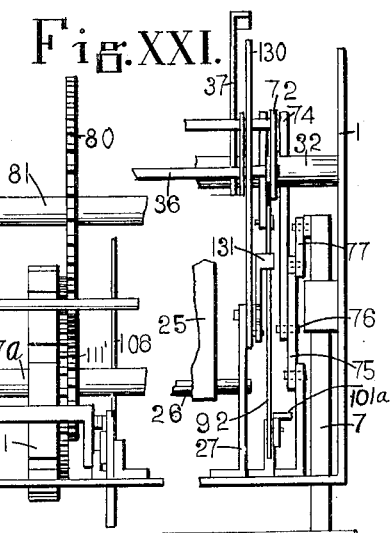
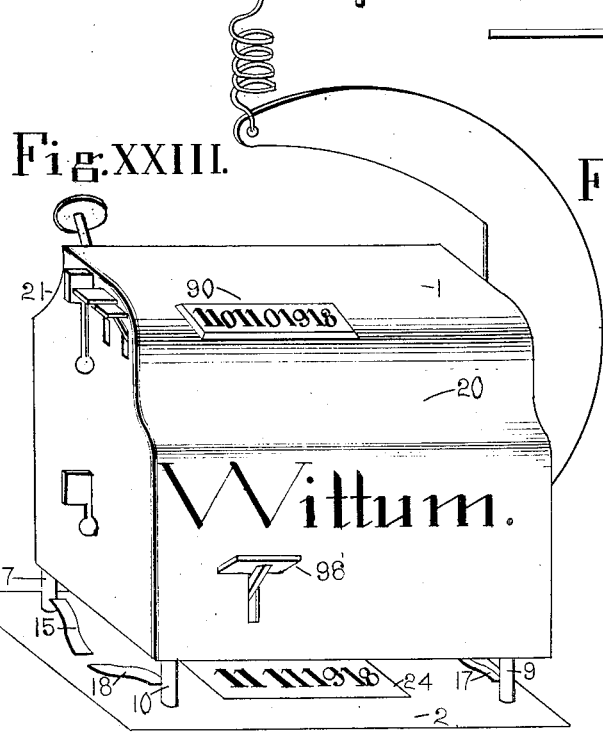
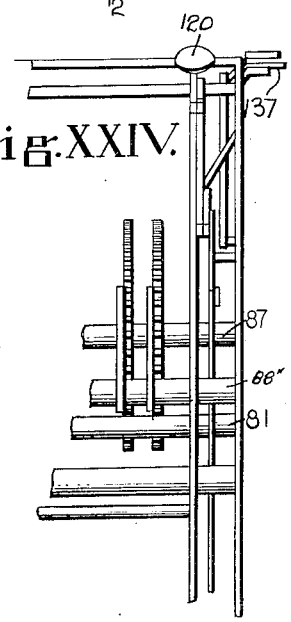
Witnesses:
Inventor.
Geo. F. Wittum.

Patented June 7, 1932

1,862,072

UNITED STATES PATENT OFFICE

GEORGE F. WITTUM, OF VALLEJO, CALIFORNIA, ASSIGNOR TO JAMES BITCON, OF VALLEJO, CALIFORNIA

CALCULATING MACHINE

Substitute for application Serial No. 680,221, filed December 12, 1923. This application filed November 21, 1930. Serial No. 497,228.

This is a substitute application for application Serial No. 680,221, filed Dec. 12, 1923.

This invention relates to improvements in calculating and recording machines, and more particularly to calculating machines for portable operation, by which is meant, not alone that it may be carried around by hand or operated by hand, but that it is portable in use and movable to all places where records of results are required to be made from the position of operation whether motor driven or by hand actuation.

One of the objects of the invention is to produce mechanical results of calculations in addition, subtraction, multiplication and division, and record them in permanent records, thereby avoiding the loss of time required to read and write such results and the errors incident thereto.

Another object of the invention is, being necessarily a purely touch system of operation, to produce mechanical results by furnishing a means by which the operator may keep his attention on the column of figures from which calculation is to be made and record them where desired.

Another object of the invention is the means by which the calculating mechanism may be disconnected from the recording members, so that accountancy may be facilitated by number writing only and calculations made when desired.

With the foregoing and other objects in view, the invention comprises the novel construction, combination and arrangement of parts hereinafter more particularly described and illustrated in the accompanying drawings wherein is shown a preferable embodiment of the invention. It is to be understood, however, that the invention comprehends changes, variations and modifications which come within the scope of the claims hereto appended.

Fig. I is a rear elevation of the calculating machine, partly in section, with the case plate and the key-board removed, drawn on a large scale. It shows the partition wall which is an important feature, also the digit carriage mounted on the digit shaft and tilting rod, the two latter being broken off at the end, the ratchet delivery of digit carriage movement, and the spring actuating force and the levers which move it.

The main feature in this sketch is the equalizing levers and springs to raise the case, and the guide rods and tracks by which the case and base are held in normal position. The base is shown as an anchorage of bearings of the equalizing levers and the positions of the rest springs. There are nine orders of enumeration shown in this sketch; though a range of that extent is provisional, and each order consists of a total wheel, an accumulating wheel, a pawl gear and a ratchet gear, a sector gear, a determinate gear and a figure wheel, in addition to two totalizing gears not shown in this sketch.

Fig. II is a left end view, the end case plate being removed. It is nearly actual size, and but tentative only, with the gears drawn on the circular pitch line. It shows the finger grip and the resting place for the palm of the hand.

Fig. III is the key-board of actual size with a spacer key and the dollar sign added to the ten digits. The keys are blank because it is a purely touch system of operation. It shows the finger grip at the top with a bar set therein called the "rest clutch", by means of which the device may be held to prevent "throwing the machine". If Fig. I be reduced to actual size, Fig. III would cover it down to the bottom of the case from end to end.

Fig. IV is a rear view with the cover removed, showing the digit carriage mounted on the digit shaft and tilting rod, with the main actuating lever to tilt the digit carriage. The springs at the top of the sketch are reaction springs to keep the digit bars in aligned position to meet the digit levers when the tilting movement takes place.

Fig. V is a top view showing the key-board, key plate and arc follower which delivers movement to the digit levers shown with a reaction spring attached to each and to the side of the digit carriage. The main feature of this sketch is the plan of the levers conveying the actuating force which moves the digit carriage step by step during the setting of the digit levers. The top of the case is removed.

Fig. VI is a graphic illustration of digit lever movement, with a sector gear and a ratchet and pawl gear drawn on the circular pitch line. It also shows the arm keyed to the digit shaft to actuate the tilting movement of the ligit carriage by means of the tilting rod, with the link bar for clearing the digit carriage.

Fig. VII represents the differential lever arranged to produce a variable ratchet movement of the digit carriage in cooperation with the regular movement of the case relative to the base. It shows the position of the differential lever after ratchet exhaust by key operation.

Fig. VIII shows the same lever represented in Fig. VII at the end of the recessive movement and in position to be returned to normal by the approach movement.

Fig. IX is a right elevation with a broken strip of the partition wall left. A nearly complete view of the digit starting members is shown; also the differential lever for a short distance of ratchet travel, and the equalizing levers and springs near the end of recession. The right end of the case cover is removed.

Fig. X represents a flexible lever used in the calculator, that is, flexible between the power and the load, the rigidity being removed by substituting a spring. The actuating spring functions independently of the substituted spring.

Fig. XI is the skeleton of an escapement.

Fig. XII shows the manner of key stem penetration of key plate and the spring to return the key after depression.

Fig. XIII represents the protective bars used for the purpose of delaying remeshing. This is the main feature of the sketch, with some of the automatic cooperative provisions of the device.

Fig. XIV is a front view where the operator sits or takes hold of the machine to operate it. The row of naughts at the top with the case cover placed thereon is the total line. The disconnecting frame with the lifting device, and the figure wheels at the bottom with part of the latter broken away, are represented in the sketch.

Fig. XV is a left elevation of many of the parts shown in assembled form, the end plate being entirely removed. The digit starting members, the computing members and the recording members as well as the totalizing members are quite fully represented.

Fig. XVI shows a gear with gear guards spot welded together and is less than one-thirtieth of an inch thick.

Fig. XVII shows the total key operatively joined to a wedge shaped plate operative in a slot over the shaft of total wheels. One total wheel is shown with the digit band partly broken away. The mid-section of the shaft is also broken away, leaving the end of the shaft showing the spring thrust against which the wedge mentioned is operative. The same member is represented in Fig. XV in a different view. The clearing and retrograde sector gears are also shown.

Fig. XVIII represents the lower section of Fig. XV more in detail. They both show the alignment bars to engage the figure wheels with the connecting bar for tying them together, the disconnecting frame with the operative latch bar under the main actuating lever, and the operative lever between the case and base. Two important springs are shown but omitted in Fig. XV.

Fig. XIX shows the disengagement hook to release the connecting bar 104 in Fig. XV and Fig. XVIII.

Fig. XX is a sectional view from the top looking down to the line $m-n$ on Fig. XV with some of the parts omitted. It represents the two last orders in this embodiment. It shows the total wheels, the disconnecting frame, the direct clearing sector gear in mesh with the pinion gear mounted on the total wheel shaft, and the retrograde sector gear not in mesh with its pinion gear similarly mounted.

Fig. XXI is a sectional view from the rear below the line $m-n$ and between the lines $o-p$ and $q-r$ in Fig. XV, showing the figure wheel as mounted and the alignment bar engaging it. Parts to the left are broken away as well as to the right.

Fig. XXII is a sectional view from the rear in to the line $q-r$ of Fig. XV., showing the digit shaft with one digit lever mounted, the tilting rod, the main actuating lever with connection to the digit shaft and to the guide rod fastened to the base, and a small part of the key plate mounted.

Fig. XXIII represents the desk appearance of the calculator with the handle by which it is relieved of its weight. The arm by which the machine is more efficiently portable is not shown, but its radius of movement will meet any practical requirement.

Fig. XXIV is a rear view partly in section of Fig. XV and Fig. XX. It shows the accumulating gears and digit stopping bars in two orders only, and the clearing key and total key, the digit pins are not shown.

Fig. XXV is a sectional view of totalizing members from the front of the machine with the case plate removed. But two orders are shown of which the shafts bearing them are broken away. The total gears without the digit bands are at the top and in the order named are mounted and in mesh; the total gears, the accumulating gears of which but a small portion is visible, the pawl gears, paired with which to the left are respectively, the ratchet gears; from this point to the bottom two sets of gears are shown, after the pawl gears, the retrograde gears and the meshing gears; then back to the ratchet gears, the sector gears and the determinate gears. On the left close to the case wall is the left parallel bar which supports the shaft of the pawl gears with the lifting device keyed to its supporting rod.

Fig. XXVI is an end elevation of the parts shown in Fig. XXV the disconnecting frame being better brought out from this view. The end case plate is removed. The additional parts shown here but not shown in Fig. XXV are the zero arms to position the figure wheels at the zero position for recording, as are also the one space multiple acting levers to move the figure wheels one space.

Fig. XXVII shows the different positions the multiple-acting levers take, including its automatic movement, then its actuated movement to result in positioning the figure wheels at the zero recording point.

Fig. XXVIII represents the return movement of the lever shown in Fig. XXVII.

Fig. XXIX shows the multiple-acting levers with the extension plates reaching from any order to the order below it.

Fig. XXX shows the zero lever in operative position to be moved by the zero pin shown in a section of a pawl gear drawn on the circular pitch line.

Fig. XXXI is a small detail of Fig. XXX in which a latch connection is released.

Fig. XXXII represents a front view of the actuating arm of the meshing for totalization.

Fig. XXXIII is a tentative view of the slotted plate operative over the total shaft, showing a strong spring against which all cumulative actuations take place and the stop where it ceases to be operative but operative nearest the source of power.

Case and Base

Case 1, Fig. I, contains the mechanism of the calculator arranged to be operative by connection with base 2. Levers 3—3 actuate case 1 and base 2 by separating the two members, called recession. They are jointed so as to be opened and closed with the movement of case 1 and base 2 relative to each other, are pivotally joined to base 2 at one end at the center of gravity of case 1 and at the other end anchored pivotally to a rigid bar 5 fastened to case 1 and set parallel to the longitudinal direction of case 1 and within the same. Bar 5 rises above its fastenings in order to allow levers 3—3 to fold up within case 1 during the return or stamping movement, called the motion of approach. Springs 4—4 are attached to the folding joints of levers 3—3 to straighten them, nearly, in the recessive movement for operative action of the mechanism,—"throwing the machine" to actuate the mechanism of the calculator. Levers 3—3, in connection with springs 4—4 are constructed to equalize the force of recession and approach.

Guide rods

Guide rods 7, 8, 9, 10, Figs. I, IX, XIII, XV, are fastened to base 2 and tracks 11, 12, 13, 14, provided therefor are fastened to case 1 and movable thereon to maintain case 1 and base 2 in position for their relative movement. The recessive movement of case 1 and base 2 actuates the mechanism to function in the process of calculation, and the approach movement returns the functioning members to normal position and stamps the result as a recording process.

Rest springs

The rest springs 15, 16, 17, 18, Figs. I, IX, XIII, XV, XXIII, anchored in base 2 are important features since case 1 rests thereon during the operation of keys of the device and catch the blow of the approach movement in recording by hand. Other uses of the rest springs will be described presently.

Partition wall

A partition wall 19 Figs. I, IV, V, IX, XIV, divides case 1 into compartments set about mid way between the ends of case 1, in which bearings of rods and shafts are provided, far enough from the rear to make longitudinal room for other movable parts. In Fig. IX partition wall 19 is tentatively shown to be an irregular line extending from the top to the bottom of case 1, comprising three compartments, the left portion being cut away at the line 19a.

Hand rest

In Figs. II, IX, XIII, XV, is a form of hand rest 20, extending across the machine on the front side where the operator takes hold of it, designed to fit the palm of the hand for an easy grip of the machine by hand.

Finger grip

A finger grip 21, Figs. I, III, IX, XIII, XV, is provided to give the hand a grip against the hand rest 20 on the opposite side of the machine to move it from place to place for portable operation. It is concave and extends across the machine longitudinally.

Rest clutch

Set into finger grip 21 is bar 5a, Fig. III, about the length of three finger widths and movable against spring resistance, to which is attached, by various provisions for changing the direction of force, a connecting rod reaching to a latch 6 near the bottom of case 1. It is a rest clutch to hold the calculator inoperative when being moved from one place to another. Latch 6 is movable into engagement with catch 6a only when the hand grips the calculator to move it, 6a being secured to base 2. It is not an important feature except in case the operator wishes to hold the machine from "throwing".

Case and base opening

Through the bottom of case 1, Fig. I, and through the bottom of base 2, Fig. II, located so as to clear the recording members, are openings 23 and 24 to bring them in contact with the paper upon which a record may be stamped.

Key board, key plate and ARC-follower

Key board 22 is within easy reach of the fingers of the hand for key operation. Key plate 25, Figs. V, IX, XIII, XV, is mounted on rod 26 with bearings 27 anchored in case 1. It is a little larger than the area of key board 22, with openings provided for respective key stems for following back by keys not in immediate use. Key plate 25, with reinforced rigidity, moves in an oscillatory manner on its bearing, returning to initial position by spring reaction. Each key penetrates key plate 25 by a penetrating stem. The operated key moves the key plate through an arc limited by a stop to a distance equaling the digit value of the key, shown in 22a, 22b, 22c, Fig. IX. Keys are arranged in a manner for convenient and rapid use by the operator who must think their position by the usual "touch" system of key operation. They stand actually in the order 3, 2, 1, 0, but this order to the operator stands 0, 1, 2, 3, since he is on the opposite side of the machine.

The above keys occupy the upper row, the digits 4, 5, 6, 7, the middle row, and 8, 9, spacer, and dollar sign, the bottom row. Each key movement is provided with a stop adjusted to the angle of oscillation for the different distances above the axis, and to the value of the digit key operated. This arrangement makes the movement of the keys about the same, the larger digits being placed in the bottom row and the smaller digits at the upper row, making the movement of arc follower 28 pivotally anchored to key plate 25, near the mean distance of oscillation. Arc follower 28 is connected with key plate 25 by short connecting bar 29, Fig. XIII. It is mounted on a short rod 28', secured to partition wall 19 above the mean distance of oscillation, and is made to swing to and fro with oscillatory movement of key plate 25 with its swinging end nearly tangential with said oscillatory movement. The point of said mean distance is called the delivery point. It is located in the units order at the mean line of oscillation of key plate 25.

Short connecting bar 29 is pivotally joined to key plate 25 at 30, at the other end to the swinging end of arc follower 28. At the end of arc follower 28 a floating bar 31 with a contact edge having a spring 31a which tends to close it up like a knife blade but it kept open at the right position by a stop.

When edge 31 is moved by key plate 25 and a frictionless contact is made between it and an arcuately moving lever fulcrumed below it, it will follow approximately the curve of the latter through the range of its movement.

Digit shaft

Digit shaft 32 extends through the length of case 1, and is mounted in bearings provided therein. It occupies the longitudinal compartment adjacent to the two compartments on either side of partition wall 19. It is rotatable through a small arc against reaction spring 33 attached to case 1 and to arm 34, keyed thereto. Arm 34, by means of spring 33, returns shaft 32 to normal position, and is provided with a stop to prevent vibration.

Digit carriage

Digit carriage 35 is provided with bearings 35a and 35b, Fig. V, and mounted on digit shaft 32, having a longitudinal movement thereon extending along said shaft its full length, and a transverse movement thereon which may be to any practical extent on said shaft. The transverse movement is produced by tilting rod 36, parallel to digit shaft 32 and mounted in bearings provided in arms 36a and 36b keyed to said shaft. Tilting rod 36 passes through bearings 35a and 35b provided in the ends of digit carriage 35, the latter being movable on tilting rod 36 concurrently with movement on said shaft. The movement of said digit carriage along said shaft and rod and the tilting movement on said shaft are independent of each other and may be concurrent events. Figs. I, III, IV, V, IX.

Digit levers

Mounted on said digit shaft and inside of said digit carriage 35 is a series of digit levers 37, movable with said digit carriage along said digit shaft and arcuately movable thereon without reference to the tilting movement of said digit carriage. Nine orders are represented in this embodiment although they are not limited to nine. There may be as many as seventeen digit levers representing seventeen orders of enumeration in a practical construction, occupying less than seven inches of space, three and one half inches for digit repose and three and one half inches for tilting movement, expressing a number of more than nine trillion dollars, including cents, and two sets of figures for two column calculations with an inoperative middle order between, of one million dollars in both examples. Each digit lever is provided with a ratchet base 38, Fig. XV, comprising a segment wheel with shaft 32 as a bearing and the periphery thereof provided with teeth, equally spaced, beginning at the digit lever arm and extending back twelve teeth—as many as there are characters in key board 22.

Each digit lever is provided with a friction notch or bench to receive floating lever 31 of arc follower 28. A plurality of benches, in line, is lower than edge 31 to allow digit carriage 35 free movement along shaft 32. The teeth in the ratchet bases of digit levers 37 engage respective pawls 39, one at each digit lever. They are secured to digit carriage 35 and have no movement other than the flex inherent in spring steel. When edge 31 moves digit lever 37 in its arcuate movement, pawl 39 clicks the teeth of ratchet base 38, the number of teeth passed over by said pawl being determined by the value of the digit key operated. Each key, pawl, ratchet base and digit lever is a duplicate of the others, except in the case of the stop placed in the respective keys to fix their digit values.

Pawl 39 comes to rest in the tooth of the ratchet base which corresponds to said key value. Each key predetermines a different tooth in said ratchet base by its range limit, owing to the stop provided therefor. No digit lever can be set to a greater arcuate movement than the last in the scale of arcuate movements shown, Fig. VI. Between 51 and 52 are the twelve positions of any digit lever, numerically set. Each position to the right is one digit greater in the scale mentioned, and such position of the digit lever determines the digit value. Any character-position of the digit lever may be repeated through the full range of digit carriage 35.

Digit levers 37 are each provided with a reaction spring 42, Fig. I, attached to ratchet base 38 and to the side of digit carriage 35, at 42a, Fig. I.

Ratchet

Ratchet 43 carries digit carriage 35 with it, the former being suspended from digit shaft 32 by hanger bearings 44 and 45, mounted thereon, between which said digit carriage is confined to the movement of and travels with said ratchet.

The ratchet teeth are spaced equally, equalling the space between digit levers, measure the step by step movement of the digit carriage along said digit shaft, and equal the number of digit levers or orders represented in the embodiment. The ratchet is parallel to said digit shaft and confined to a track 46 in which it is movable. A spring 43a is provided to catch the blow of a violent movement during the approach of case 1 and base 2 at the terminal or home thrust of ratchet and digit carriage, Fig. I, IV, XIV.

Escapement

Movement of digit carriage 35 is measured by escapement 47 operative in ratchet 43 in the step by step movement along shaft 32. Escapement 47, Fig. XI, is tripped by arm 50 attached to key plate 25 against actuating short arm 49, Fig. IX, a lever-like projection of said escapement. Escapements are well known and need no description here. The advance of the ratchet and digit carriage takes place after the arcuate movement of a digit lever. Any digit lever having been set, with pawl 39 resting against the tooth representing the digit value of the key depressed, will advance ratchet 43 one space to another digit lever only when said key is withdrawn and the return movement of key plate 25, actuating escapement 47, is complete.

Actuating lever

This actuating lever and its differential members, in their application to the form of calculator here presented is of considerable importance since it must be adjusted to an indefinite order-range and irregular digit delivery in addition to its regular movement of recession and approach.

It is one of the two main actuating levers of the machine, and is concerned only with that part of the digit starting members relating to setting a number in the machine. The comparatively wide sweep of range which crosses the space over which ratchet 43 on its digit delivery travel takes its way, is necessarily compound in construction, besides the change of direction required to respond to the step by step movement of ratchet delivery, and to the approach and recessive directions of case 1 and base 2.

Arm 53 is the immediate element of drive to advance the ratchet. It is pivotally connected to ratchet 43 and an actuating arm 54 by connecting bar 55, joining 53 near the middle and 54 at the end thereof. 53 is connected to 56 at one end, the other end thereof being stationary but movable about its axis with a horizontal swinging movement in the direction to advance the ratchet and digit carriage on shaft 32 past the delivery point, Figs. IV, V, IX.

Actuating lever 54 is movably attached to cylindric bearing 54a, pierced by rod 127, but keyed to the latter, with bearing in shelf 58, Figs. V, IX X. Wound around the former is coil spring 59, attached to arm 54 and to shelf 58. 59 is the actuating spring by which ratchet 43 is forced against escapement 47 in its step by step movement to the delivery point. Spring 60 is wound around rod 127, attached to lever arm 57 and to actuating lever 54. Spring 60 is stronger than spring 59 and is provided to strengthen the hinge joint at the end of cylindric bearing 54a where lever 54 and arm 57 form the angle of bellcrank 54—57. Each of the bellcrank arms 54—57 are held against respective stops at the ends of said spring 60 with the latter forcing said arms against them. This provision is made to render the lever flexible to the sudden movement of approach and to allow the ratchet and digit carriage to lag uniformly in their movement. To reduce the severity of the blow still further a shock spring 43a is provided to absorb the momentum generated. Pivotally attached to arm 57 is link bar 61, movable over flanged pin 62 secured to vertical bar 63, the latter being fulcrumed at one end by bearing 64 anchored in case 1. Spring 65 holds vertical bar 63 to the end of link 61. Near the middle of vertical bar 63 is flanged pin 66 rigidly fastened to the former and movable in the link 66b of link bar 67, Fig. VIII. This link has a recessed slot 68 which drops over resetting pin 66 when link bar 67 is moved forward to engage it. Link bar 67 is pivotally joined to bellcrank 69 with bearing anchored in case 1. The other arm of said bellcrank extends through an opening in case 1 to an oscillatory bar 70 fulcrumed to bearing 71, anchored to base 2, Fig. VII, VIII. Link bar 67 when withdrawn to the right, as in the approach movement, is lifted by means of cam 67a moving up the incline 67b, with the resetting pin 66 positioned in line to move freely along the link in link bar 67 for another key operation, Fig. IX. After the approach movement, a new number is commenced, and the position of resetting pin 66 is moved step by step along the slot during the operation of keys, and at the end of said key operation pin 66 may be anywhere along said slot, depending upon the number of keys depressed. When the machine is thrown in recession link bar 67 is moved to the left until it meets the end of the link under the recessed slot 68, and the bar 63, carrying the pin 66, is moved with it, the pin 62 being carried also along its link 61 against spring 65.

A shunting incline 66a is provided to depress bar 67 at the end of its recessive stroke into recessed slot 68. Now, in the approach movement following, link bar 67, moving to the right, carries pin 66 locked in recessed slot 68, also arm 57, arm 54, and the horizontal actuating lever 53, with the ratchet and digit carriage, to the terminal thrust, thereby completing a cycle of movement.

Main actuating lever

The main actuating lever now to be described produces the tilting movement of the digit carriage and performs various offices of a minor capacity. The arm 72 is keyed to shaft 32, Figs. XV, XXII, to which is attached pivotally by pin 73, the connecting bar 74, the main actuating lever 75 being joined to bar 74 by connecting pin 76. The fulcrum of main lever 75 is anchored to case 1. Main lever 75 is attached pivotally to short pendent bar 77 which is hinged to a short supporting bar rigidly fastened to guide rod 7. Main lever 75 moves up and down about its axis at pin 78 in response to recessive and approach directions of case 1 relative to base 2, the connecting bar 74 being effective to tilt digit carriage 35, Figs. XIII, XV.

Digit bars

Digit bars 79 is a series of similar members provided to carry the results of digit starting members into the machine. A digit bar is provided for each order, and is connected at one end thereof to an eccentric pin 79a fastened in a sector gear 80, Fig. XV, the other end of each digit bar being suspended by an alignment spring 82 fastened above to a stay rod 82a, Fig. I, the resilience of spring 82 being such that the digit bar, when moved to its maximum distance by digit lever 37 may return it to normal position. The arcuate movement of digit levers 37 brings them in range for contact with said end during the tilting movement. Each digit lever determines the digit value of the digit delivered to the digit bar predetermined by the stop limit of the key which sets the digit in the digit carriage. The plurality of digit bars is placed a short distance lower than the maximum arcuate movement, and the only contact of digit levers with the digit bars is by the tilting movement. All the unset digit levers are within the arcuate range just above the beginning of the tilting range, and the value of a digit in the digit bar is determined by the excess of the tilting range over the unused distance of the arcuate range.

Sector gears

Sector gears 80 are provided with teeth sufficient only to revolve the wheels with which they are in mesh, one revolution. The angular movement of sector gears 80 is less than 180 degrees, and the two dead points of eccentric pin 79a are outside that range, because, the digit lever range, after the maximum arcuate range has been taken in the setting of digit levers, is less than the range of eccentric pin 79a.

Ratchet wheels

Ratchet wheel 83 is mounted with pawl gear 84 on shaft 85. These two gears, 83 and 84, are mounted in pairs, the ratchet wheel being provided with ten uniformly measured notches placed around the center thereof to engage a pawl 84a provided in said pawl gear 84, Fig. XV. Ratchet gear 83 is in mesh with sector gear 80 and carries the movement imparted to the latter by digit bars 79 by means of the ratchet and pawl between them into pawl gears 84. A short interval elapses between tooth 80a going into mesh with ratchet gears 83 at tooth 83a for the purpose of advancing the figure wheels one space past the blank face thereof to the naught position where recording calculations begin.

Parallel bars

The object of the parallel bars is to furnish a movable support or mounting of ratchet gears 83 in order that said gears may have automatic engagement with and disengagement from sector gears 80 at each digit delivery of a number introduced into the machine. Ratchet gears 83 and pawl gears 84 are mounted in pairs, one of each, on shaft 85 which is keyed to two parallel bars, one at each end, one bar 86 at the left end, the other bar 86', at the right end, Fig. XIV. Shaft 87 is also keyed to said bars with its ends bearing in end case 1 and partition wall 19, forming a rigid frame with the pivotal axis at shaft 87, with said ratchet gears 83 in mesh with said sector gears 80 and said pawl gears in mesh with the accumulating gears, which will now be described.

Accumulating gears

The accumulating gears 88, Figs. XV, XVI, of this calculator are mounted on shaft 87 and mesh with said pawl gears 84, above mentioned, being the only actuating contact between the orders, that is, the transfer contact. The transfer element is not represented, there being no particular variation from the well known transfer system in common use, and no claim is made for the transfer system to be used. In other respects each order is separate and independent of each other. Accumulating gears 88 are also in mesh with total wheels 89, to which latter the results of calculation are referred.

Total wheels

Total wheels 89 are mounted on shaft 89a with bearings anchored in partition wall 19 and end case 1, Fig. XIV. Digit bands 89b, with the ten digits equally spaced marked thereon, are attached respectively to total wheels 89, with numerical rotation towards the operator at the front of the machine, passing under a glass line 90, located a short distance above hand rest 20, Figs. IX, XIII, and about identical with the row of naughts at right angles to the direction of said rotation, provided in case 1, called the total line, Figs. IX, XIV, XV, XXIII. Each set of gears between the total wheels and the sector gears, inclusive, synchronize with each other, that is to say, when a digit is set for a number in the digit carriage and the tilting movement takes place, it will be reproduced in the total wheels under the total line, by the synchronous movement of the members relating to digit starting and accumulating, viz., the digit bars, the sector gears, the ratchet gears, the pawl gears, the accumulating wheels, and the total wheels, Figs. XIV, XV, XXV.

Determinate gears

The determinate gears carry digit values to the figure wheels to which they are respectively fastened. Each determinate gear 111' is in mesh with a sector gear 80, mounted on shaft 157a with bearings anchored in partition wall 19 and end case 1, being attached concentrically to figure wheel 111. Each determinate gear makes but one revolution or fraction of a revolution and is constructed to be in synchronous relation with sector gears 80, so called because its relation to the latter determines the angular movement of figure wheels 111.

Figure wheels

The figure wheels being attached to the determinate gears revolve so as to come to the initial position in unison regarding the spaces allotted to the figures located on the circumferences thereof. They are mounted on shaft 157a, as stated in the preceding paragraph, and extend below case 1 and base 2 when brought together in the motion of approach, with peripheral thickness large enough only to attach figures securely provided thereon and so as not to interfere with each other in their revolving movement. The circumferences of figure wheels 111 are divided into twelve equal parts with a prepared face on each part for the figures to be used in recording. The figures provided in said prepared faces are one each on each of said faces of the ten digits, (naught) 0 to (nine) 9, inclusive, and the dollar mark. One prepared face is blank, standing in the initial position, tangential to said figure wheels and parallel to base 2. The figure wheels may stop at any twelfth of a revolution when turned, depending upon the digit delivered by digit bar 79 and transmitted to said figure wheels, returning after release by means hereafter to be described. The figure wheels turn from the blank face in the direction of the hands of a watch with the numerical order of digits marked on each placed in the opposite direction, as are also the total wheels. Between the figures marked on the figure wheels, in regular and uniform order, notches 113 and 113a are provided for the alignment of figures before recording, which will be particularly described under "Alignment bars", ut infra.

Release bar

Release bar 40 is provided for the purpose of disconnecting pawls 39 from the ratchet bases of digit levers 37, Fig. XV.

It consists of a bar mounted in arms 41 keyed to tilting rod 36 and extends the entire length of digit shaft 32, parallel to tilting rod 36 and positioned immediately under pawls 39, so that when digit carriage 35 moves along said shaft said pawls will be in position for release of said digit levers at any stage of said movement. At the left end from the front of the machine, the supporting arm of release bar 40 passes through said tilting rod 36 and is indicated as arm 91, at the end of which a pin is provided for engagement with link 92. Link bar 92 is anchored below to limit the movement of said pin when the tilting movement takes place, link bar 92 allowing the tilting of digit carriage 35 its full range, but the release of pawls 39 is simultaneous with that range. Its action is performed every time the tilting movement occurs. When main actuating lever 75 is brought down by the motion of recession, the throw of the machine carries the pin to the upper end of link 92 when the pin in arm 91 turns tilting rod 36 in its bearings, forcing release bar 40, carried oppositely to said pin, against said pawls positioned over it, lifting the pawls out of engagement with the several ratchet bases in the manner that a wedge would separate two bodies from each other when driven between them, and returning the digit levers by springs 42 to normal position, Figs. I, XV.

Protective bars

Protective bars 93 are provided for the purpose of delaying the mesh of ratchet gears 83 with sector gears 80 until all the sector gears have been returned to the initial position, Fig. XIII. They are a series of bars separated by the amount of space occupied by sector gears 80, each one lying snugly against the latter and rigidly fastened together at fulcrum 94, all movable as one member. Into each sector gear a pin 95a is fastened similarly in each one, upon which each bar of the series rests when said sector gears occupy the initial position; so that if any sector gear is revolved through the digit distance necessary to carry digit movement into the machine, the plurality of bars will be raised by any pin 95a. If several sector gears are moved for different digit distances all the protective bars will be moved simultaneously for the greater distance which any of said pins 95a may reach in its angular movement about the center of shaft 81; and in the return to initial position by means of alignment springs 82, Fig. I, if any digit delivered by any sector gear lags in said return, its pin 95a will also lag, and hold all the protective bars from coming to rest until the lagging pin 95a has come to rest in that position. Arm 96, forming a bellcrank with the plurality of protective bars 93 extends from fulcrum 94 of said bars to a lifting device 96a, which will now be described.

Lifting device

The purpose of this member is to connect and disconnect the accumulating members and the recording members. As stated in connection with the parallel bars, ut supra, the ratchet gears are in mesh with the sector gears and carry digit values through the pawl gears to the accumulating wheels. Each calculating process which changes the result already found in total line 90 must have a new beginning in the mechanism, and to that end, the ratchet gears must have a means of disconnection from the sector gears, which are essentially a part of the digit starting mechanism. Said parallel bars, therefore, being movably mounted to secure disconnection of the actuating members, are movable by said lifting device by means of the following arrangement: viz, the rod 97, with bearings in end case 1 and partition wall 19, is provided with two similar members 96a and 96b, Fig. XIV, of sufficient lever length for engagement with said parallel bars. They are keyed to said rod 97 about the middle of said similar members, and located thereon, one at each of said parallel bars 86 and 86', Fig. XIV. A rod 98 is keyed to said parallel bars, making a rigid frame, and rests normally in jaws provided in said similar members, or said rod 98 may be keyed to said similar members and the jaws provided in said parallel bars with said rod resting therein, a matter of indifferent construction, the practicability of each being the same. An incline 99 is fastened to lifting device 96a parallel to a line joining said rods 97 and 98 and at right angles to said arm 96, the apex of said incline being towards the latter, so that movement of the plurality of bars 93 will move said arm 96, at right angles thereto, up said incline to a notch 100 into which the end of arm 96 is lodged where it remains until the tilting movement is complete.

Latch and catch provisions

An important feature of the calculator here described is the latch and catch provisions. When the machine is thrown in recession, the main actuating lever 75 descends to perform the tilting movement of digit carriage 35. Four functions result simultaneously with this actuation, first, the tilting of digit carriage 35, with the delivery of the number set therein to the sector gears, carried from which to the ratchet gears on the one hand, and to the determinate gears revolving the figure wheels, on the other hand; second, the release of digit levers 37 by raising the pawls 39 out of engagement with ratchet bases of said digit levers by means of release bar 40. The two functions above given having been already described, except in the second, above recited, in which the description of link bar 92, Fig. XV, was stated to be anchored "below", and the explanation having sufficiently advanced to describe more particularly the manner in which that is done, it will be given under the third function. Third, the latch and catch provisions, next to be described; and fourth, the action of the alignment bars, afterwards. The third function is now to be described, relating to the latch and catch provisions.

When the main actuating lever 75 descends, as above stated, it meets at the end of its movement a latch bar 101, being balanced about the middle thereof, in bearing 102 anchored in the floor of case 1. Latch bar 101 extends to link bar 92, above referred to, with a flanged pin fastened in the end thereof, and over which a right angled link 92b is operative in the horizontal part thereof as an anchorage to said link bar 92 during the tilting movement of said digit carriage 35, Fig. XV, XXII. A contact plate or platform 101a, Fig. XXII, is fastened to latch bar 101 a short distance from said flanged pin upon which said main lever 75 operates when it descends to meet said latch bar. A result of that descent and contact is to hold said link bar 92 in resistance to the pin mounted in arm 91 when it reaches the end of the upper link during the tilting movement of digit carriage 35; another result is to raise the opposite end of latch bar 101 out of the catch 103 provided in connecting bar 104, the latter being provided with a track 104a, Fig. XV, in which it moves by reaction spring 105, Fig. XVIII, when released by said latch bar 101. Spring 105, attached to connecting bar 104, anchored in case 1, draws the connecting bar back from its latch connection at 103 towards its anchorage, and having a wire connection 106 attached thereto and to arm 107 of lifting device 96a, gives the latter a short rotating impulse about its axis 97 against spring 108, lifting the parallel bars 86 and 86' with the ratchet gears mounted on shaft 85, out of the mesh with sector gears 80. In the mean while, arm 96 having moved up said incline 99 by the movement of protective bars 93 and latched in said notch 100, the short rotation of said lifting device, by the means stated, causes said arm 96 to be disengaged from said notch in said incline by slipping off the same and returning to normal position. The fourth function stated above relating to the action of the latch and catch provisions deals with the alignment bars which will now be described.

Alignment bars

The fourth function of said latch and catch provisions is closing the alignment bars to secure a straight line of figures for recording. The alignment bars are positioned along and adjacent to the figure wheels, Fig. XV, XXI, one on either side thereof, with a sharp edge designed to engage angled notches 113 and 113a provided in the circumferences of said figure wheels. Both ends of each alignment bar are mounted in arms keyed thereto, reaching to bearings anchored in said case 1. They extend upwardly to about a third of a diameter of said figure wheels, and have an oscillatory movement at each engagement with said notches in the recessive movement and at each disengagement from said notches in the approach movement. When the movement of latch bar 101 releases connecting bar 104, in addition to actuating the lifting device 96a, said connecting bar 104 also actuates a compound lever to draw together the two alignment bars 109 and 110 engaging the notches 113 and 113a provided, as above stated, on said circumferences. The notches are placed uniformly about said circumferences, and like the figures between each two notches, are constructed in synchronous relation with the digit delivery members previously referred to. The alignment bars are actuated by a bellcrank 112 set in bearing 112a fastened to case 1, Fig. XV, XVIII, the short arm thereof being joined pivotally with connecting bar 104, and the long arm thereof being connected with a pendant bar 115, joined pivotally to tie bar 114. Tie bar 114 connects the two alignment bars and controls their oscillatory movements by depressing and elevating pendent bar 115.

Tread lever

The four functions previously referred to having been described in detail, it will be in order now to describe the return to normal position of the members involved, Fig. XV, Fig. XVIII, illustrating this action.

It will be seen that case 1 is resting upon base springs 15 and 18, two other springs 16 and 17, Fig. IX, being other resting places. Case 1 occupies the resting position indicated while operation of keys is in progress, but after the recessive movement the approach movement is delivered and case 1 passes this resting position, depressing springs 15, 16, 17, 18 flat, so that case 1 and base 2 may be brought together for the impression or stamping of the number through openings 23 and 24 against the paper or recording surface. The latter action is concerned with the return of members mentioned and will now be described. A tread lever 116 extends through case 1, adjacent to connecting bar 104, reaching to base 2 when the approach movement passes the base springs referred to, and with its bearing in case 1. The upper end of tread lever 116 is provided with a latch 177 arranged to engage a catch 118 fastened in connecting bar 104. Spring 119 maintain tread lever in a depressed position against a stop provided therefor. In the approach movement (of case 1) relative to base 2, at the point when tread lever 116 touches base 2, the latch 117 moves backwardly to catch 118 in connecting bar 104 by reason of the bellcrank form of its upper and lower arms where it latches with catch 118: then by means of the united forces of said rest springs, aided by spring 119 and the recessive springs 4—4, said case 1 will move in the recessive direction to the top of said rest springs, drawing said connecting bar to normal position, relatching said latch bar 101 into catch 103, relaxing the wire connection 106 with the remesh of gears 83 and 80, and disconnecting said alignment bars from the notches in said figure wheels, returning the latter to normal position by means of the alignment springs 82. When the "throw" of the machine in recession occurs, after a new number has been set in the digit starting members, it is necessary to release latch 117 after the new cycle in recession is started and before it is completed, and to accomplish that release 118a is provided as shown in Fig. XIX, consisting of a perpendicular latch with fulcrum in base 2 and extending so as to project into case 1 above a level with said rest springs where a pin 117b is fastened in latch 117, designed to meet 118a during the recessive movement, releasing it from catch 118 preparatory to the completion of the second recessive movement. A spring 117a serves for flexibility of perpendicular latch 118a, with a stop provided to hold the latter in line to meet pin 117b.

Before leaving the latch and catch provisions and the various other members intimately connected therewith, it seems timely at this stage of the descriptions to refer to disconnecting key 96'. Key 96', Figs. XXIII, XXVI, is the means by which the recording members may be used separately and the calculating processes rendered neutral. It is merely an outside key located below hand rest 20 and extending in and securely fastened to lifting device 96a. By pressing the key down it will perform the functions of raising the ratchet gears out of the mesh with sector gears 80, described under several heads heretofore particularly elucidated. Several means occur to me how the disconnection may be made stable and enduring temporarily, one being a construction in which the key depression passes the key stem over an unstable point in a locked position; another being a latch to hold said lifting device against spring 108, Fig. XV.

*Error key*

The provision for releasing the digit levers on account of error and the return of the digit carriage to the units order will be described now. An error key 120, Fig. XXIV, conveniently located in finger grip 21, has a penetrating stem 121, Fig. XV, at the left end of the machine, stem 121 being connected with bellcrank 122 which is keyed to rod 123. Rod 123 extends through to the right end of the machine (that is, to the left of the drawings, Fig. V), with bearings in the respective ends of case 1, Figs. V, IX, XV. In Fig. IX it is shown with bar 124 keyed thereto, said rod 123 being operative by torsion force to move bar 124 which carries the key inpulse to bar 125 extending across to the front of the machine and there connected pivotally with a loosely mounted arm 126 upon perpendicular rod 127. Key impulse at 120 will, therefore, return digit carriage 35 by means of arm 128 keyed to said rod 127, arm 128 being provided with a stop pin 129 for contact and movement by said arm of rod 127, the latter coordinating, by spring connection, with the actuating force of compound levers and bellcrank 54—57.

A provision acting simultaneously with the above is clearing the digit carriage of all the set levers by releasing the digit levers 37 from their ratchet bases.

It may be noted that link 92, in which the pin fastened in arm 91 is operative, stands, when in the repose position, with said pin and arm 91 about in line with the longitudinal direction of said link, and that a lateral thrust against the link bar will be effective to turn tilting rod 36 in the same manner as tilting the digit carriage will be effective to rotate said tilting rod, as previously described. The action in the case now considered is that the lateral thrust may force link bar 92 against the pin referred to and thereby give a rotating impulse to said tilting rod, and the arms supporting release bar 40, being fastened oppositely to arm 91, will force said release bar against the several pawls engaging the ratchet bases of digit levers 37, releasing them. For that purpose, then, a bar 130, attached pivotally to said bellcrank 122 and extending to bellcrank 131, one arm of the latter connected with said bar 130, the other arm in close proximity to link bar 92, Figs. XV, XXII, is provided, so that said key impulse may exert a lateral thrust movement against said link bar 92, rotating said tilting rod and restoring the digit levers to normal position simultaneously with the movement of said digit carriage to the units order.

*Clearing the machine*

This action is purely a key function, and no movement is required by other members of the calculator not actuated by said key except the number writing key. It, therefore, requires two keys to clear the machine: the clearing key and the number writing key 96'. The right hand is already in position to actuate the clearing key 137, being positioned on top of the machine, and the left hand free to reach to the number writing key and separate the computing members from the digit starting members. The left hand finger reaching to the number writing key 96', the latter being attached rigidly to lifting device 96a, raises the plurality of ratchet gears out of the mesh with the sector gears, key 137 is pressed down by a finger of the right hand resting on top of the machine, the stem 136 of said key being pivotally connected to an arm of sector gear 144 mounted on shaft 87. Sector gear 144 revolves to the left in engagement with gear 185 mounted loosely on total wheel shaft 89a. Gear 185 is provided with a ratchet and pawl to revolve said shaft, the pawl being secured to said gear and in operative adjacency to ratchet wheel 186 which is keyed to said shaft.

Secured to shaft 89a is clearing post 191, Figs. XV, XVII, one for each total wheel, with a stop fastened inside of digit bands 89b, the stop end thereof being in each total wheel even with the naught provided thereon, and pointing in the opposite direction in which the total wheels turn; so that when the total wheels are in motion to the right, as in the calculating process, the ends of the stops slip off the clearing posts, which are stationary, but when the latter are in motion, as in clearing the machine, the plurality of clearing posts, making a complete turn, engage the respective stops, turning the total wheels, promiscuously gathered together, with the naughts under the total line 90. It must be understood, however, that clearing the machine must be done when it rests upon the rest springs, as if ready for key operation, in which position the digit carriage, with its digit levers, is already in the initial position occurring at the end of the approach throw.

Since the total wheels, being in mesh with the accumulating wheels, must be retarded, as with a break, during the movement of key 137 in order that the clearing posts 191 may have a slight resistance when in contact with clearing stops 192, Fig. XVII, a retarding angle 88' is provided, being mounted on shaft 88'' with an angled edge operative to hold said accumulating wheels with any two digit pins poised at the apex of said angled edge, as shown in Fig. XV. A plurality of retarding angles 88' is mounted on said shaft 88'', distributed along the same at intervals equaling the space between accumulating wheels, one adjacent to each of the latter and on the side thereof to engage said digit pins, and keyed to said shaft.

An operative arm 88a is provided for said shaft 88'' and extends to arm 88b keyed to shaft 145. To this shaft an actuating arm 88c is keyed, being connected with key 137 by bar 88d. Arm 88b is provided with a spring contact between it and arm 88a, not shown. 88a and 88b are single members, being the sole actuating means of shaft 88''.

Repetition

The repeat key moves various members to a neutral position, but in other respects the repetition of a number does not differ from normal actuations. Repeat key 92a, Fig. XV, is keyed to rod 67a which passes through the machine beyond partition wall 19 where it is shown with an arm 67', Fig. IX, with the end of the latter formed into a link through which passes the differential lever bar 67.

When key 92a is moved towards the rear of the machine, arm 67', keyed to the other end, is rotated, by means of said rod 67a, towards the front of the machine, and by that movement bar 67 is raised by said link arm 67' so that it will not fall over resetting pin 66, Fig. VII into slot 68 of said bar 67, the latter remaining neutral, and the digit carriage not returning to normal position, and as many recessive and approach movements of the machine as may be desired may be thrown with the above members in disengagement.

Another essential to the repetition of a number is to render the provisions for clearing the digit levers neutral. To this end, bar 174a is provided. It is pivotally attached to link bar 92 and to an arm keyed to said rod 67a. The same movement of key 92a which renders bar 67 neutral will render link bar 92 also neutral, because such movement will move bar 92 along the horizontal link therein provided in right angled link 92b with the pin in latch bar 101 in direct line with the vertical side thereof, whence link bar 92 will be free to lengthen its range when the tilting movement of digit carriage is thrown in recession, and as many repetitions of the number set in the digit levers may be made as desired.

Totalizing

Obtaining a mechanical total for the recording members is an important feature of a calculator. This calculator provides for that feature by simple transfer of the number accumulated in the total line to the figure wheels. The problem was solved by the unison of gear action. Any arrangement of digits in the total wheels can be reproduced in the figure wheels for recording by turning the total wheel retrograde to the naught position with the figure wheels starting at the naught position. In other words, if the figure wheels are positioned on the naughts for recording each order will carry its digit from the total line to the figure wheels by the retrograde motion of the total wheels, that is, clearing to zero, and moving the respective figure wheels from the position of naught to said total digit.

Several methods to perform this automatic function of the adjustment of naughts to the recording position for the purpose of totalizing the number in the total line have appeared practical. The method here selected requires a preliminary provision in preparing for the adjustment of naughts to the recording position to the exclusion of naughts not included in the total number. To accomplish that automatic adjustment of naughts a means of setting the naughts is provided for such of the naughts in the number corresponding to the orders involved, that is to say, each new order involved takes on its preparation for a naught in the figure wheels. Therefore, to that end, a zero pin 146 is fastened in each pawl gear 84, Fig. XXVI, at the point most convenient to be reached by an operative bellcrank 147—151 mounted loosely on rod 150 and located as near as may be ascertainable at a point which will be synchronous with the naught position in the total line, one arm of said bellcrank being hinged to bar 149, the latter more particularly referred to hereafter, the other arm serving as a pointer or zero arm and extending to said zero pin 146 which engages said arm and moves it when pawl gear 84 is actuated. A plurality of bellcranks similar to 147—151 is provided, one for each order, and, like the pins 146, similarly located, and mounted loosely on said rod 150, functioning the same and to the same purpose. An arc lever 148 is keyed to rod 150, contiguous to said bellcrank and operative therewith when actuated. A plurality of arc levers 148 is provided, in all respects similar to each other, one for each order, keyed to said rod 150, opposite and adjacent to said pawl gears 84, and in the respective planes of the latter. Each bellcrank in the series is provided with a latch to engage a catch provided in said arc levers so that the arm 151 will come to rest in its automatic movement, above and upon said catch in said arc arm when said arm 151 is actuated by said zero pin 146.

Reverting now to bar 149, before mentioned, a bellcrank 155—158, Fig. XXVII, is mounted loosely upon rod 156 with pin connection at the lower arm thereof to bar 149. These bellcranks are in series also, one for each order, mounted similarly on rod 156, Fig. XXIX, set in the same plane with figure wheels 111, respectively, and adjacent thereto, with a radius of motion that, when said arm 151, actuated by said zero pin 146, rests above the catch in arc lever 148, Fig. XXX previously referred to, the point 158a, Fig. XXVII positioned by bar 149 near the notch 113 of said figure wheels, will be adjusted for further actuations by key impulse to finish the movement described by actuating rod 150 with the arc levers 148 keyed thereto.

Returning to the means provided for further actuating said bellcranks by their various connections, an arm 151a, Fig. XXX is keyed to rod 150, said arm being hinged to bar 172 by pin 173, Fig. XXVI, and bar 172 hinged to wedge plate 174 by pin connection 175, wedge plate 174 being actuated by key bar 176 and anchored at 177. Key 164 is the outside actuating force attached to key bar 176.

When the point 158 is moved to the leaning position of 158a, Fig. XXVII, by the action of zero pin 146, and latched as described above, all bellcranks 155—158 below the highest order involved are similarly leaned close to figure wheels 111 by means of overlapping extension plate 163, Fig. XXIX; and whatever order is first to move, the extension plate of that order will carry, by bellcranks 155—158, said point 158, to said leaning position. When key pressure is applied, the points 158 will move about their axes 156 and engage the several notches 113, and when arms 158 have entered notches 113 and moved them one space, so that the naughts in the figure wheels stand in the recording position, the key pressure is released and the bell cranks described must return to normal position. In that event it will be necessary that point 158 be moved back by the same course taken in moving said figure wheels, and to facilitate that return a joint 160 is provided, Fig. XXVII, with a rear extension 159, Fig. XXVIII, which is opened at hinge 160 by the return movement, breaking said arm 158 at said joint and releasing the same from said notch 113, and in reaching the normal position said extension 159 is forced against stop bar 162 and closed. Reverting again to bellcrank 147—151, Fig. XXX, when arm 151 is latched above the end of arc lever 148, it is pried loose at the end of the total key stroke by wedge 148a, a projecting device fastened to case 1 and located at each order. Another view of this arrangement is shown in Fig. XXXI, wherein wedge 148a is about to contact with arc lever 148 with its latched arm 151 carried to separating wedge 148a. The next requirement to be considered for totalizing a number in the total line by transfer to the recording position, is the gear connection which will complete the mesh of a train of wheels from the total wheels to the figure wheels. This requires two additional gears which together span a necessary gap in the train and at the same time leave the two end gears, the total wheels and the figure wheels, to revolve in the necessary direction for the transfer of a number in the former to the latter.

Beginning, then, with meshing gears 165, Fig. XXVI, then the retrograde gears 166, the train is complete for one order, each gear being a member of a plurality of gears, one of each for each order. The object here is to keep out of the plurality of trains of wheels all the meshing gears of orders not involved in the total number to be transferred from the total wheels to the figure wheels. The same provision for automatic adjustment of the one-space multiple acting levers performs that function concurrently with selection of the meshing gears, since the actuating link bar 171 controlling them is pivotally connected at the point where bar 149 is operative, and the automatic movement of the one-space multiple acting levers being latched, as above stated, to the actuating arc arm for further total key stroke, positions link bar 171 a short distance along its link, but not disturbing the meshing gears by contact with pin 171a. Therefore, retrograde gears 166, rotatable and in mesh with pawl gears 84, are mounted on rod 166a which is keyed to extensions 167 and 167', fastened to parallel bars 86 and 86', respectively, the latter extension not being shown on the drawings. A plurality of meshing gears 165, similar to the retrograde gears, are mounted separately on respective pins riveted to side bars 169, anchored pivotally on said rod 166a, each being in mesh with a retrograde gear and movable into mesh with the totalizing gears 157 independently of each other. A rod 168, Figs. XXVI, XXXII, anchored in bearings 170 fastened to case 1, is provided with a plurality of inverted bellcranks 164'—164a mounted on said rod at the angle thereof, one-arm, 164', being connected with side bars 169a by pin 169b, leading to the axis of meshing gears 165 and serving as a controlling support of the meshing gears; the other arm, 164a, being provided with a flanged pin 171a over which the link of link bar 171 is operative and movable by pivotal connection with bar 149.

Now, the pin provided in any pawl gear, in the process of calculation, will bear against the zero arm 147 and perform its functions automatically regarding the adjustment of the one-space multiple acting levers, and, at the same time, take up the link space of link bar 171. The latter is an adjustment of the meshing gears involving only the orders of the total number, the other meshing gears in the higher orders of the calculator not being latched above arc lever 148, the immediate actuating force of bars 149; and when the arc levers 148 are actuated by further total key stroke, all the unlatched automatic levers 147—151 will not be moved by said key stroke, but only those which are latched will be moved. There is an instant of lingering movement of the meshing gears in link 171 while the one-space multiple acting levers complete the movement to advance the figure wheels one space, and at the completion of the latter, link 171 closes with pin 171a and the meshing gears involved in the total engage the totalizing gears 157, completing the train of wheels above mentioned and stops by means of stop bar 172b. All the lower lever actions cease with this contact of 174' and stop 172b, the former being an arm of wedge plate 174, movable at pin 181, Fig. XXXIII, and resting in stop 180. By tracing these various members on the drawings, Fig. XXVI, it may be seen that wedge plate 174 and bar 172 are the only single members, but on Fig. XXV where two orders are shown, which is illustrative of all the orders, from the rod 150, carrying the loosely mounted bellcranks 147—151, adjacent to and cooperative with arc levers 148, the latter keyed to said rod 150, are a plurality of members, as are also bars 149, and the disconnecting members 148a. Fig. XXIX is illustrative of bars 149 with the one-space multiple acting levers mounted on rod 156, but the plurality of link bars 171 is not so shown, being obviously members of a necessary plurality, and the inverted bellcranks 164'—164a are in series, also, one for each order, with the bearing rod 168 supporting them. Spring 179 makes a practically rigid arm of 174', extending from pin 181 and sufficient, when actuated by total key 164 to perform the functions in the following order, 1st, disconnecting the ratchet gears from the sector gears by means of bar 172a having a link operative over pin 95 to actuate the lifting device 96a. 2nd, revolving the figure wheels one space, moving the naughts thereon to the recording position by means of the automatic latch provisions occurring during the process of calculation of the loosely mounted bellcrank zero arms, movable by zero pin 146 above and upon the actuating arc lever 148, and thereby positioning said members to actuate bars 149, and, by total key stroke, to move the one-space multiple acting levers through one space to the position of naught for recording; 3rd, and, concurrently therewith, elevating link bar 171 to actuate the pin 171a provided in arm 164a, connecting the meshing gears 165 with the totalizing gears 157. At this point lever arm 174' makes contact with stop 172b.

The above functions having been performed cease at stop 172b. Then having enough margin left in link 182' to descend against spring 179, wedge plate 174, further acts to finish the functions of final key stroke of key 164.

Referring again to the manner in which a number in the total line may be transferred to the figure wheels, it will be seen that a sector gear 184, mounted on shaft 87, having an arm 183 in which a pin is fastened with a link 182 provided at the end of total key post 164, will revolve the total wheels in retrograde direction, but with the aid of several provisions added. It may be observed, also, from Fig. XVII that 89a requires a short movement to the left in order to align sector gear 184 to mesh with gear 185, there being a blank space in sector gear 184 to receive a lateral movement of gear 185, and at the same time, to disalign gear 190 and throw it out of the mesh with sector gear 144. This is accomplished by wedge plate 187, Figs. XV, XVII, XX, XXVI, XXXIII. Its action is, on total key pressure, to force wedge 187, a thickened portion of link plate 174, between a collar keyed to shaft 89a and the shaft bearing which serves as an abutment 187a to said wedge action, the latter being fastened to case 1. Link 182' provides for this movement of shaft thrust preceding the action of key movement 164 of sector gear 184. The shaft thrust produced by wedge plate 187 has a rebound by means of spring 193 coiled around shaft 89a with a collar 193a fastened to said shaft to keep it pressed against abutment 187a. The retrograde movement of total wheels 89 is performed by a clearing post 191, one provided for each total wheel, fastened to shaft 89a, similar in all respects to each other, and located under digit bands 89b. The pawl 192, which contacts with clearing post 191 for the purpose of turning the total wheels in retrograde direction, is mounted on the inner face of digit band 89b with a free end, bent to coincide with the circle described by the clearing posts, and located even with the naught position of the figures placed on said digit bands. Each pawl has a double stop pointing oppositely, with each stop even with the naught position, one stop to intercept the clearing post when turned in normal direction, and one stop to intercept the clearing posts when moved inwardly to the position for totalizing by said key thrust to engage members for rotation in retrograde direction. The two positions of clearing posts 191, one before said thrust action occurs and one after the thrust is made by key pressure, are represented for comparison only, Fig. XVII.

Total index

The index indicating a total is actuated by bar 176, the latter being operative by total key 164. It is shown in Fig. IX where bar $a$ is connected with an arm $b'$ at $b''$ and keyed to rod $ba$ which extends to the other end of the machine where an arm $b$ is hinged to short connecting bar $c$, the latter being connected pivotally to said total key bar 176. The bar $a$ extends to bellcrank $d$, which is provided with an arm $e$, pivotal at angle of said bellcrank, and extending to the axis 157a of the figure wheels 111, where a ring in $e$ forms its bearing on said axis; so that when $d$ is raised by bar $a$, the members $e$ and $i$ are straightened, and $f$, upon which the sign of totality is provided, is lowered to an even position with the figures placed on the figure wheels. $f$ is attached to bar $g$ which is anchored at $h$ by a pin $h$, all of which latter members are operative and aligned to be effective adjacent to the units order of said total number.

Operative features

Having gone over the calculator in detail, it remains now to explain its operative features, which will be a general description except in the parts that require details to bring out clearly the modus operandi. This calculator, placed normally on the rest springs, is ready for operation of keys, but it requires the weight of the hand, resting lightly on top of the machine, to hold it down on the rest springs to overcome the recessive springs provided to separate the case from the base which are movable relative to each other. The keyboard is arranged with the keys under the fingers while the hand rests on top of the case. The ten digits, the dollar mark and the spacer are located, as the operator thinks them but does not see them, in the order, viz: 0, 1, 2, 3, at the top row, 4, 5, 6, 7, in the middle row, 8, 9, spacer, $, in the bottom row, twelve keys. Probably the spacer key will occupy the naught position after it is determined whether or not it is more conveniently located in that position. If it is desired to place a number in the machine as, e. g., $9,471,328.65, the keys must be used in the order in which the number is read. The above number, given as an example, requires ten orders, the dollar mark occupying one order. Larger numbers require larger machines. Fourteen to sixteen orders is a practical machine, carrying the number beyond hundreds of billions. The dollar mark key is the first to be used, the last key in the bottom row, the digit key 9 is next, then the digit key 4, and so on through the number. Each key is provided with a key post having a fixed stop to determine its movement-value, and a penetrating stem with a shoulder provided thereon against which a key plate with an opening therein for each penetrating stem to follow back for another key action is provided. When a key is depressed, its shoulder, touching said key plate, moves the latter to said stop, and the key plate has performed its action for that key. The key plate is oscillatory in movement from the lower edge, its anchorage, to the top, the arcuate distance through which it oscillates increasing from said edge to the top. At the mean distance of oscillation an arc follower is provided, so called because it converts one arcuate movement into a minimum of divergence from another arcuate movement. Its location is in the units order, called the delivery point. The arc follower contacts with the digit lever. The ratchet and digit carriage, mounted together, on shaft 32, move along the latter by means of a spring actuated arm attached pivotally to the ratchet, said spring being tensioned during a previous approach movement. The ratchet with its escapement feeds the digit carriage to the delivery point, one movement of the digit carriage at a time. The digit key post with its fixed stop to limit its movement to the value of the key action, operative against the key plate and through the arc follower, delivers the digit value to the first digit lever in the digit carriage at the delivery point, and responding to the movement of said key plate, the arc follower makes contact with the digit lever and moves it through an arcuate distance limited by the stop value of the key post, where a pawl engages the ratchet tooth in the ratchet base of the digit lever representing the digit value of the key used. When key depression is withdrawn the key plate returns to initial position, releasing the ratchet and digit carriage by means of an arm attached to said key plate which actuates said escapement. Now the digit value of the arcuate movement of the digit lever determines the digit value of the digit bar movement, and hence, the angular value of the sector gear movement, and consequently, the ratchet gear movement and that of the pawl gear, paired with the latter, also the accumulating wheel in mesh with the total wheel, on the one hand, and the determinate gear movement with the figure wheel attached, on the other hand, all of which movements being synchronous with the arcuate movement of said digit lever. When the ratchet and digit carriage are permitted to advance by the operation of the escapement, as above noted, the differential levers do not move, only link bar 61 moves, being drawn by arm 57 keyed to cylindrical bearing 54a, carrying oscillatory bar 63 with it by means of pin 62 operative in link 61, with pin 66 moving step by step along slot 66b until the latter pin reaches the end of slot 66b, the latter being ample to meet the full range of the step by step movement. Where the utility of link 61 is made obvious is in writing small numbers in which but few escapements of the ratchet occur, and so, in the recessive movement, the differential members must have free movement to throw the machine, and in any small number set in the digit carriage, the movement in recession will close up the link 66b by the movement of pin 66, or rather by the movement of differential bar 67 against the end and under recessed slot 68, and oscillatory bar 63 must have free movement which is furnished in link 61 by the travel of pin 62 against the spring 65. Spring 59 unwinds during the step by step movement and remains neutral during the recessive movement, the ratchet abutting against the escapement where the step by step movement stops. At the throw of the machine in recession the differential lever 67 moves to the front, or, as in Figs. VII, VIII, IX, to the left. This movement is regular, as are all the movements in recession and approach.

After each key of the number has been set, the first action, tilting the digit carriage, is effective by means of the main actuating lever, connected by hinge joint to an arm keyed to shaft 32, said main lever being connected at its free end to the top of guide rod 7. As guide rod 7 is secured to base 2 said main lever descends relative to case 1 in the recessive movement, and the anchorage of said main lever rises with case 1 to draw down said free end at any point of connection with said arm between said free end and said anchorage, turning said digit shaft in its bearings, and by means of the tilting rod mounted in arms and keyed to said shaft, said main lever will tilt the digit carriage mounted thereon. When the tilting movement occurs, the digit levers, set for a number to be carried into the machine, are held rigidly to the position given them by the action of the arc follower by means of pawls engaging the ratchet bases provided in the digit levers.

Since the arcuate movement of the digit levers require that they be set in the digit carriage at a different angle, each depending upon the value of the digit it represents, the ends of the digit levers will be uneven, and they will meet the digit bars with irregular contact, the greater value of the digit set the greater angle of arcuate movement and the first to meet the digit bar during the tilting movement. As the end of each digit lever makes contact with its digit bar, promiscuously started, the various angular distances of the sector gears revolved by the digit bars will synchronize with the arcuate distances of the respective digit levers, and the predetermined digit value of the said arcuate movement will be reproduced both in the figure wheels for recording and in the total wheels for accumulation.

This movement in recession involves four distinct actions, 1st, tilting the digit carriage and delivering the digit values in each order by the digit starting members to the digit bars, as previously stated. This action includes raising the protective bars to insure finished action of the sector gears preparatory to placing the figure wheels in position for the alignment bars; 2nd, disconnecting the computing members from the digit starting members by means of the lifting device; 3rd, release of the digit levers from their set position; 4th, aligning the figure wheels for recording by means of the alignment bars. The 1st action requires a moment of time. The 2nd, 3rd, and 4th actions are simultaneous and instantaneous, and occur at the end of recession. Under the first heading the 3rd action will be given summarily, not that it is numerically first in order or importance, the last three actions being contemporaneous events, but because it is the natural reaction of the members first concerned in the transmission of digit values into the calculator. It is therefore pertinent to mention the means by which the digit levers are released when the action of the main actuating lever has finished the throw of the machine. The release bar is such a means. It is mounted in arms keyed to the tilting rod and parallel to the latter, lying under the row of pawls which are fastened to the digit carriage and engaging the various ratchet bases. An arm fastened in said tilting rod, positioned oppositely to said arms, having a pin in the end thereof over which a link bar is operative to limit the range of the tilting movement to the movement of said release bar, and by means of said link bar operative over said pin slightly revolving said tilting rod in its bearings, said opposite arms are forced against the pawls to raise them from their ratchet bases, releasing them. When the main actuating lever descends through its full range, it comes in contact with a latch bar, placed in operative proximity to the former, and holds the link bar, functioning with said latch bar, as a rigid anchorage, to the exact span between said anchorage and said range; in which case, the release bar, immediately under the pawls, is forced against them, releasing them.

Reverting, now, to the protective bars: When the digit bars are actuated by the digit starting members, the sector gears are revolved, being pivotally connected with the former by respective eccentric pins, similar to a crankbar connection, and forced into an angular position synchronous with the digit value related back to the digit key used. As any sector gear responds to its digit bar, its angular movement raises conjointly the series of protective bars, lying upon the shaft of the sector gears and adjacent to the latter, by means of a pin fastened eccentrically therein opposite the first mentioned eccentric pins; so that the movement of any sector gear will raise the plurality of protective bars, and the end of the adjusting arm which is rigidly fastened to the axis of the protective bars at right angles to the latter, will move up the incline provided for that purpose on the lifting device, adjacent to said arm, and lodge in a notch at the base of said incline where it remains immovable for the interval of time necessary for the return movement of all the sector gears, to be referred to herein again. The lifting device is provided with an arm to which is attached a wire connection leading to said connecting bar 104, latched in tension by spring 105 and operative by said latch bar 101. In the opposite ends of the lifting device, the latter being mounted on a rod located near the meshing frame, rest the ends of two parallel bars with the shaft support of the ratchet gears keyed to each to secure the rigidity of said frame, and thus forming the connecting link in the train of wheels between the digit starting members and the computing members, said ratchet gears being in mesh with the sector gears. Then when the main lever releases the latch bar and the connecting bar is drawn away from the catch, the wire connection attached to the lifting device slightly turns the latter and raises said frame, disconnecting said ratchet gears from said sector gears; and concurrently with the slight turning of the lifting device on its axis, the notch end of said incline fastened thereto is elevated by the lifting movement of said frame, and the adjusting arm, resting in said notch, moves laterally off the base of said incline by said movement, freeing said arm to react by spring impulse, not shown, and by means of the alignment springs 82, the sector gears are returned to normal position.

Since the 2nd and 3rd actions have been necessarily intermingled with the 1st action, the 4th action is the only one remaining, and the 4th action involves much that has already been stated regarding the 2nd and 3rd actions. The 4th action, aligning the figure wheels for recording, is clearly shown in Fig. XV, with the auxiliary members cooperating therewith, the connecting bar with the catch engaging the latch bar, above described, being ready for contact with the main actuating lever. The connection between the connecting bar and the tie bar which spans the distance between the two alignment bars is supplied by bellcrank action, so that breaking the tie bar will shorten its length, and force the two alignment bars closer together and into the notches provided synchronously on the periphery of the figure wheels. The bearings at the other ends of the alignment bars from the ones shown in the sketch are set slightly closer to the figure wheels in order that the lost motion by loose bearings or bent by light material may be remedied. The tilting of the digit carriage, the release of the digit levers, the disconnection of the sector gears from the computing members, and the closing of the alignment bars, for recording, a combination of cooperative elements, the latter three occurring by action of the first, are the important functions of the calculator. Another function is returning the members to normal position. This is done by the approach movement by forcing the case down against the base by hand, or by forcing the base up against the case by motor drive. Two actions are noted in that movement: 1st, the tread lever 116 to reset the connecting bar which returns the ratchet gears in mesh with the sector gears and releases the alignment bars for the return of the figure wheels to initial position, and 2nd, the return of the digit carriage to initial position. The actions in this movement are contemporaneous. The tread lever, being in T lever form, with one arm extending below case 1 to contact with base 2 as the actuating arm, one arm, a projection of the actuating arm for anchorage of the spring reaction, with bearing about the middle of the two former, and one arm, a latch arm, movable parallel to said connecting bar in close adjacency to the latter, engages a catch provided in said connecting bar by means of the latch provided on said latch arm, when the approach actuation forces the case and base together. The approach movement overcomes the four rest springs mounted on the base, in addition to said reaction spring, besides the recessive springs provided to separate said case and base. The three forces mentioned have power of reaction sufficient to draw the connecting bar by means of the latch in said latch arm engaging the catch in said connecting bar, referred to above, into engagement of said connecting bar, the second catch of the latter with the latch point of the latch bar, holding the connecting bar so that the alignment bars, joined to the former, will be out of engagement with the notches of said figure wheels, and releasing, also, the lifting device, remeshing the ratchet gears with the sector gears.

The 2nd action in approach is returning the digit carriage to the initial position, the ultimate throw of the machine in recession having placed the mechanism in position to return that member. In other words, the resetting slot in link bar 67 drops over the resetting pin. This is a completed movement before the approach movement begins. The approach movement, being opposite to that of the recessive movement, consists in forcing the calculator down against base 2 with sufficient energy only to overcome the rest springs and produce an inked impression of the recording members upon the paper or book beneath the base. This operation may be called a violent blow, and to equalize which and render the bellcrank 54—57 flexible, a spring is provided, wound around the axis of the former. The angle of said bellcrank is rigid when attempting to open it against a stop placed at the loaded arm; and the actuating arm is flexible to the loaded arm, the former being keyed to cylindrical bearing 54a, and is resilient from said stop by means of said spring, wound to the right around said axis, so that its tendency is to open the angle of said bellcrank arms against said stop. Then when reaction is considered and a violent force is applied to the actuating arm, the increasing load, by virtue of its inertia will cause said loaded arm to recede from said stop and lag in its movement, the inertia of said load being stored in said spring and distributed throughout the remainder of its travel, coming to the initial position by means of said spring after the blow has been struck.

The bellcrank movement to convert the up and down motion of recession and approach into the horizontal movement of link bar 67 is effective from the base with suitable means to respond to its movable arms. Near the end of the approach movement, the end of link bar is raised out of the recessed slot operative over the resetting pin, on an incline by means of a cam positioned to meet said incline.

At the ultimate end of the approach movement, the latch provided on the tread lever engages the catch on the connecting bar, and the calculator rises to the top of the rest springs, latching the second catch on said connecting bar, with the latch point of the latch bar, placing the members in initial position.

Before reviewing the totalizing functions, it is appropriate at this stage, to precede such review by describing the operation of key accessories, viz: the error key, the repeat key, the number writing key, the clearing key, the totalizing key. Some of the keys are not shown in the drawings, but will appear for the first time in the construction of the machine, and are not claimed in this application, such as the subtotal key, the subtraction key, the multiplication key, and the division key.

The error key: Although described in the specification in detail, a general review of its functional members may add to its clarity. The error key has direct connection with the clearing of the digit carriage by returning the digit levers to normal position, and contemporaneous with such clearing, returning the digit carriage to normal position also. By means of bellcrank lever action, a lateral thrust is effective from said error key against the link bar generally operative to secure the clearing of the digit carriage during the recessive movement. The error key is operative independently of the recessive movement. The lateral thrust accomplishes the same result as does the tilting movement of the digit carriage, the purpose being in each case to turn the tilting rod and force the release bar, mounted in arms keyed to the former, against the pawls immediately over the release bar, raising them out of engagement with the notches in the ratchet bases of the digit levers. This action requires but a finger stroke. When released, as described, the digit levers fly back to normal position by means of reaction springs provided for that purpose. The error key, by means of said bellcrank lever connection, actuates the actuating lever of the digit carriage by means of a torsion rod keyed to said bellcrank and extending to the right end of the machine from the operator facing it, where provision is made for changing the direction of the force applied to said torsion rod, with various levers which rotate the bearing rod of said actuating lever. The bearing rod is perpendicular to the floor of the case, and is anchored above said actuating lever with an obstructing pin secured to an arm keyed to said bearing rod. The appropriate connections between said torsion rod and said bearing rod leave said arm free to perform its functions in normal action of the actuating lever by means of a loosely mounted arm on said bearing rod, said connections actuating the rigid arm of said bearing rod and effecting the return of the digit carriage to initial position similarly to that provided in the regular manner.

The repeat key consists mainly in rendering neutral the actions of members concerned in returning the digit carriage to initial position and releasing the digit levers from their set digit values. The repeat key, placed at the left end to the operator on the outside, is keyed to a repeat rod which extends through the machine beyond the partition wall to the differential lever where an elevating link bar is provided keyed to said repeat rod, and through which the differential lever is operative without interference. Action of the repeat key by rotation of the repeat rod away from the operator raises the differential lever bar and keeps it raised from its usual function of dropping over the resetting pin into the resetting slot for the purpose of returning the digit carriage to initial position but becomes inoperative as to the latter action and becomes neutral in its alternations to conform to the recessive and approach movements, on the one hand; and on the other hand, the release of the digit levers is neutralized by means of lengthening the link bar 92. Right angled link 92b serves this purpose. To the repeat rod and arm is keyed positioned in line with link bar 92 to actuate a bar pivotally connected with link bar 92; then the same movement of repeat key which elevates the differential lever to render it neutral will move link bar 92 in the horizontal slot 92b over and in line with the perpendicular side of said right angled slot 92b, so that the range of the tilting movement of the digit carriage will be lengthened, the tilting movement not interfering thereby with the release bar on account of the neutral range of said tilting movement provided by the vertical side of said right angled slot of said link bar 92, and the digit levers will not be released from their set positions, repetitions of the number set being indefinitely continued.

The number writing key has been called the disconnecting key in some places herein because its office is solely to disconnect the computing members from the digit starting members, leaving the recording members independent in action. This key is merely an outside means of actuating the lifting device. by pressing the key down the parts of the lifting device opposite to the key attachment is operative to raise the ratchet gears out of the mesh with the sector gears, the former plurality of gears being the movable means to connect and disconnect the respective trains of wheels in each order of the calculator.

The clearing key, having connection with an arm fastened to sector gear 144, has direct connection with the clearing wheel mounted loosely on the total wheel shaft, the latter being provided with a ratchet wheel and pawl to turn said shaft. Pressing down said key will move said sector gear to the left, revolving said clearing wheel to the right, the same as the general movement of the total wheels in the process of calculation, the pawl being attached to said clearing wheel and the ratchet wheel keyed to said shaft; then when said shaft is revolved, by the means stated the plurality of clearing posts, fastened to said shaft and evenly positioned in the same plane, will collect the total wheels by meeting the respective stops fastened on the inner side of the digit bands with the ends pointing oppositely to the normal direction revolved and even with the respective naughts placed thereon, gathering all the orders of the total wheels into a uniform row of naughts under the total line, the clearing wheel having but one turn by the actuating sector gear and the clearing posts standing in initial position even with said total line; so that in the regular movement of the total wheels, the stops fastened to the digit bands brush lightly over the ends of the clearing posts, but when clearing takes place, no chance is given to pass the stops, and they are gathered and carried, wherever found in the circumference of their rotation, to the total line. The sector gear returns by spring reaction, rotating said clearing wheel backwards by means of the disengagement of said ratchet wheel and said pawl.

The first movement in clearing the machine, however, is to reach with the left hand finger to disconnect the digit starting members from the computing members with key 96', the other parts of the calculator being already in position for that operation.

In order to render the total wheels, in mesh with the accumulating wheels, slightly resistant to the clearing posts of the total wheels shaft, a retarding angle is provided for each accumulating wheel, being positioned with the angle extending between any two digit pins fastened in said accumulating wheels, so that said digit pins may slip over the apex of said angle in either direction, normal or retrograde. The plurality of retarding angles are keyed to a shaft anchored within operative distance of said accumulating wheels, and is actuated by an arm of said retarding angle by its connection with a bar extending to the stem of the clearing key. A spring contact of minor importance relieves the actuating arm of its rigidity.

Of course, totalizing a number can mean nothing except transferring a total accumulated in the total wheels to the figure wheels for recording. The total in the total line, obtained during the process of calculation, is a total which can be transferred at any stage of the accumulation to the recording members. It is accomplished by automatic movement of various members into the position comprising a train of wheels from and including the total wheel to the totalizing wheel fastened to the figure wheel, then by key action, revolving the total wheel in retrograde direction, that is, opposite to the direction of regular calculation, to the naught in the total line, but with the naught in the figure wheel set in the position for recording. This condition applies to all the orders in the calculator from the units order to the ultimate range of the machine. Before this can be done, however, a preliminary preparation is made automatically to set the naughts in the figure wheels for recording, for the reason that, with the naught as the starting point in the figure wheel the figure of any order in the total line moves, by retrograde action, to the naught position, while the naught in the recording position moves to the figure first shown in the total line. This automatic preparation begins with the first number set in the machine, and includes the highest order of such number, increasing to a higher order still as additional orders accumulate, as small as the figure "1" in the units order, or as large as millions in the appropriate orders, but whatever the number, be it large or small, the naught in the order of the number to be transferred is set in the recording position of the figure wheels, and all the orders below the highest of the number are set likewise; because the pin, fastened symmetrically in each pawl gear, synchronous with the naught in the total line, coming to the same position in clearing, as above described, and in the totalizing of a number, as here commenced, moves the bellcrank lever 147, mounted loosely on rod 150, the naught arm of the bellcrank being actuated by the naught pin, the other arm attached pivotally to a bar extending to bellcrank 155, the latter bellcrank being mounted adjacent to the figure wheels with the actuating arm describing an arc intersecting the circumference of the figure wheel and engaging the notch provided therein, and for its return a joint is provided to bend during said return, it having an extension to said joint to close said bend against a bar located near said extension, so that said return will straighten said arm and leave it in normal position. The above mechanism is all free movement and automatic, requiring no other force than that of the recessive springs during actuation of the same.

The foregoing being preparatory only, all the naughts of the orders of a number, and no others, will be positioned automatically in the recording position in readiness for key action.

1st. The movement of key action to totalize a number is to unmesh or disconnect the computing members from the digit starting members; 2nd, the movement by key action to revolve the figure wheels one space to the naught position for recording; 3rd, the movement by key action to establish connection between the computing members and the recording members, forming a train of wheels in each order from the total wheels to the totalizing wheels fastened to the recording members; and 4th, The movement by key action to move the total wheel shaft by thrust impulse thereof to disconnect the clearing wheel mounted thereon from the direct actuating sector gear, and connect the actuating total wheel with the retrograde sector gear, concurrently adjusting the clearing posts from the digit band stops of direct clearing to the digit band stops of the retrograde transmission of total digits to the figure wheels; and 5th, the actuation of the retrograde sector gears to make effective the transfer recited in the 4th.

These five movements of the totalizing key, while separately distinct, are, in fact, quite simultaneous, but occur in the order given. Then, having actuated the total key to its limit, the case being positioned on the rest springs ready for another key operation, the recessive movement occurs, during which no other important change takes place in the mechanism, and afterwards the approach movement is given, with the number transferred to the figure wheels for recording.

Concerning the 1st movement, disconnecting the computing members from the digit starting members, a few movements outside of the general means for actuating the lifting device for such disconnection, already described, are operative by said totalizing key by means of a link bar which actuates the lifting device, said link bar being actuated by its connection with an arm of a wedge plate, the latter receiving actuation from the total key stem. The link bar operative against a pin fastened in the lifting device raises the meshing frame to effect the disconnection mentioned by key movement, the purpose of the link being to provide other movements of the lifting device not related to said key. The 2nd movement by key action advances the figure wheels one space from the blank face to the naught. The key movement finds the naught arm moving in some of the orders of the number to be totalized, but perhaps not all of them, in which latter case the naught arm of the highest order will have moved by means of the naught pin, and the actuating leg of the bellcrank, of which said naught or zero arm forms a part, becomes latched to an actuating arc arm keyed to the rod bearing thereof. This movement actuates the lower bellcrank by the connecting bar extending operatively between the two bellcranks, and one arm of the lower bellcrank, having been set automatically by the movement of said naught or zero arm, and latched to said arc arm, is forced, by said total key action, into the notches of said figure wheels and revolved one space and into the notches of no other figure wheels, the preparation for moving the higher orders above those of the number totalized not being set for key actuation, and the total key continues to descend. Now, the figure wheels, having been moved one space to the position of naught, the 3rd movement by key action takes place, and the meshing wheel begins its movement to connect the totalizing wheel therewith by means of a short link bar connected with the lower bellcrank at the same point of connection therewith where the connecting bar actuates said lower bellcrank, mentioned above, and extends therefrom to a pin over which said link is operative, fastened to an arm which is keyed to a rod upon which is mounted a plurality of similar actuating arms, serving as actuating supports to the meshing wheels. The meshing wheels are a series and movable separately to mesh with respective totalizing wheels, mounted on different bearing rods, and movable in and out of mesh independently; the former being also in mesh with respective retrograde gears, the respective pair, the meshing gear and the retrograde wheel comprising the connection between the pawl gears and the totalizing gears by which the train of wheels, above referred to, provided in each order, is complete. When the 3rd action of the key movement is complete, the 4th action of said key movement has entered upon its function to thrust the total shaft in a short distance against a reaction spring provided at the remote end thereof, by which movement the clearing wheel is disconnected from the clearing sector gear and the total clearing wheel becomes engaged with the total clearing sector gear, and by which, also, the clearing posts, moving with said shaft are placed in position for engagement with the digit band stops to clear the total wheels from the promiscuous distribution of the digits of the number totalized in retrograde direction, then; 5th, at this stage of the totalizing movement of members the wedge plate, operative by means of a link, slidable up and down by total key action, over the total shaft, being provided with a projecting arm to which is attached pivotally the actuating bars which perform the actuations of the four prior actions of said key movement, and which is blocked by finishing their key stroke, and said key stroke, being required to make further movement to actuate said retrograde sector gear, said arm of said wedge plate is provided with a strong reaction spring sufficient to actuate said lower functions, but necessarily continuous in movement still by applying additional force to said key to overcome said spring and move said retrograde sector gear to rotate said total wheels in retrograde direction, and thereby transfer said total number to the figure wheels for recording; after which the recessive movement, not changing the members or disturbing the same materially, the case rises, and returns in the approach movement to record said total number.

The index of the total is connected with the total key action. It is placed adjacent to the units order and operative only when a total is desired. Its feature is a torsion rod extending from the vicinity of the total key to lever action ending a little to the right of the units order. It is quite simple in construction, having a jointed member anchored bearing around the shaft of the figure wheels which is straightened by lever action when the stamping occurs to record the total, and broken to raise it out of reach when not in use.

I claim, therefore, in a calculating and recording machine for portable operation:

1. The combination of a case enclosing a calculating mechanism including digit starting members, computing members and recording members, the latter two arranged in a series of sets of operative members, each set having a total wheel, an accumulating wheel, a pawl gear, a ratchet gear, the latter two comprising a pair with ratchet and pawl between to carry the former into rotation, a sector gear, a determinate gear and a figure wheel, the aggregate representing an order of enumeration positioned in the same plane, the digit starting members having digit keys to move transversely, one at a time, into operative position, the several digit levers mounted in a digit carriage, and, by means of a ratchet anchored to the latter, movable longitudinally step by step past said orders, concurrently with said transverse movement, to the range determined, upon which said case is mounted for movement in recessive and approach directions relative to said base, guide rods fastened to said base and tracks therefor provided in said case to hold them in position for said movement, lever connections between said case and said base to actuate said mechanism by said movement, equalizing levers and springs to effect the recessive movement thereof, and a series of rest springs fastened to said base to hold said case in normal position relative to said base.

2. The combination of a case enclosing a calculating mechanism including digit starting members, computing members and recording members, the latter two arranged in a series of sets of operative members, each comprising one order, the digit starting members having digit keys to move transversely, one at a time, into operative position, the several digit levers mounted in a digit carriage, and, by means of a ratchet anchored to the latter, movable longitudinally step by step past said orders, concurrently with said transverse movement, to the range determined, a base upon which said case is mounted for movement in recessive and approach directions relative to said base, guide rods fastened to said base and tracks therefor provided in said case to hold them in position for said movement, lever connections between said case and said base to actuate said mechanism by said movement, equalizing levers and spring to effect the recessive movement thereof, a selective key plate with bearings in said case at one edge of the former, and with openings through which respective key stems are operative to move the same and return intact, being oscillatory through a small arc, a mean line of oscillation, called the delivery point, having the smaller digits above and the larger digits below said mean line, adjusted to stops provided on said key stems to determine the respective digit values of said keys, a pendulous arc follower hinged to said key plate at said delivery point with a floating edge, and a digit carriage mounted on a shaft and tilting rod parallel to each other, having a series of digit levers movable transversely and longitudinally on said shaft mounted therein, said edge being movable by said key plate to contact with said digit levers, one at a time at said delivery point, by movement of said digit carriage past said orders and following each digit lever to a selected position corresponding with the digit selection of said key plate.

3. The combination of a case enclosing a calculating mechanism including digit starting members, computing members and recording members, the latter two arranged in a series of sets of operative members each comprising one order, a base upon which said case is mounted for movement in recessive and approach directions relative to said base, lever connections between said case and said base to actuate said mechanism by said movement, a series of rest springs fastened to said base to hold said case in normal position, a digit shaft mounted in bearings in said case, a tilting rod parallel thereto and mounted in arms keyed to said shaft, a digit carriage mounted thereon and movable along said shaft and rod and tiltable on said shaft by means of said rod when said shaft is partially rotated, a series of arcuately movable digit levers mounted therein having ratchet bases with teeth spaced equally and an equal fraction of said arcuate movement, with a pawl engaging each and, by means of a reaction spring, holding the respective digit levers in selective position, a selective key plate with bearings in said case at one edge of the former having digit key stems operative through openings therein to move and return the same intact, being adjusted to stops provided on said key stems to determine the digit values of respective keys, a pendulous arc follower hinged to said key plate at the mean line of its movement, called the delivery point, with a floating edge for contact with a digit lever, and a ratchet attached to said digit carriage movable step by step past the orders by means of an escapement engaging it, the latter being actuated by an arm secured to said key plate.

4. The combination of a case enclosing a calculating mechanism including digit starting members, computing members and recording members with means of setting a number in the digit starting members, being delivered by means of a ratchet and escapement to a series of digit levers movable transversely in a digit carriage by digit key action to set said number in said digit levers, one at a time, concurrently with such delivery, to a delivery point, a base upon which said case is mounted for movement in recessive and approach directions relative to said base, lever connections between said case and said base to actuate said mechanism by said movement, equalizing levers and springs to effect the recessive movement thereof, a flexible actuating bellcrank having one arm with compound increments of sweep pivotally attached to said ratchet, positioned in one plane and the actuating leg thereof in another plane, fastened to a cylindrical bearing between said arm and said leg to provide room for coils of actuating springs mounted therein, one of the latter being attached to said case and said arm to move said ratchet when brought to tension by said approach movement and one attached to said arm and said leg to render said bellcrank flexible to sudden movement, having expansion stops to hold them to a collapsible but not an expansive movement, and a differential lever actuated by lever connections between said case and said base, being provided with a link having a recessed end operative over a resetting pin to engage the latter at the end of recession to return the members to normal position during approach by means of said recessed end, said pin being fastened to a vertical bar hinged in said case to move with one end free in which a pin is fastened to operate in a link of a connecting bar, joined to said leg, so that paying out said spring for ratchet delivery may deliver said digit levers to said delivery point concurrently with movement of said resetting pin along said link.

5. The combination of a case enclosing a calculating mechanism, including digit starting members, computing members and recording members, a base upon which said case is mounted for movement in recessive and approach directions relative to said base, lever connections between said base and said case to actuate said mechanism by said movement, equalizing levers and springs to effect the recessive movement thereof, guide rods fastened to said base and tracks therefor provided in said case to hold the latter in position for said movement, a digit shaft mounted in bearings in said case, a tilting rod parallel thereto and mounted in arms keyed to said shaft, a digit carriage mounted thereon and movable along said shaft and rod and tiltable on said shaft by means of said rod when said shaft is partially rotated, a series of digit levers mounted in said digit carriage and means of setting the respective digit levers to a predetermined digit value in a predetermined selective position, a main actuating lever with bearing in said case with the actuating end pivotally attached to the top of a guide rod, having a crank bar keyed to said shaft with a pin bearing to join a connecting bar thereto and to said main lever between its bearing and said guide rod, said main lever being movable downwardly and said case movable upwardly in recession to draw down said crank bar and tilt said digit carriage its full range, and a series of digit bars each joined pivotally to an eccentric pin fastened similarly in a sector gear the latter mounted on a shaft with bearings in said case and positioned near said digit levers in respective planes, having reaction springs for each to hold them severally in alignment with said digit levers, said digit bars meeting the digit levers, moving by means of the latter in the tilting movement, to turn the sector gears, so that the angular movement of said sector gears may synchronize with the predetermined digit selection of said digit levers.

6. The combination of a case enclosing a calculating mechanism including digit starting members, computing members and recording members, the latter two arranged in a series of sets of operative members comprising one order, the digit starting members having digit keys to move transversely, one at a time, into operative position, the several digit levers mounted in a digit carriage, and, by means of a ratchet anchored to the latter, movable longitudinally step by step past said orders, concurrently with said transverse movement, to the range determined, a base upon which said case is mounted for movement in recessive and approach directions relative to said base, guide rods fastened to said base and tracks therefor provided in said case to hold them in position for said movement, lever connections between said case and said base to actuate said mechanism by said movement, equalizing levers and springs to effect the recessive movement thereof, means for setting a number in said digit carriage in a digit selective position and means for transmitting the digit value of said selection to a series of sector gears having diameters proportionate with a series of ratchet gears, paired, respectively, with a series of pawl gears, with a ratchet and pawl between to carry the latter into rotation, said pawl gears being in mesh with accumulating wheels and said ratchet gears with said sector gears, said ratchet gears and pawl gears being mounted on a shaft keyed to two parallel bars, one at each end of said shaft and slightly movable in bearings provided in the ends of said parallel bars and mounted on the accumulating wheel shaft, moving said ratchet gears to engage said sector gears during the movement of said transmitting means to place in angular position said sector gears, so that said gears will synchronize with the digit selection of said transmitting means and thereafter disengage said gears, and a lifting device mounted in duplicate, one at each end of a rod adjacent to the movable ends of said parallel bars, having jaws provided therein to engage a rod keyed to said parallel bars.

7. The combination of a case enclosing a calculating mechanism including digit starting members, computing members and recording members, the latter two arranged in a series of sets of operative members, each comprising one order, the digit starting members having digit keys to move transversely, one at a time, into operative position, the several digit levers mounted in a digit carriage, and, by means of a ratchet anchored to the latter, movable longitudinally step by step past said orders, concurrently with said transverse movement, to the range determined, a base upon which said case is mounted for movement in recessive and approach directions relative to said base, guide rods fastened to said base and tracks therefor provided in said case to hold them in position for said movement, lever connections between said case and said base to actuate said mechanism by said movement, equalizing levers and springs to effect the recessive movement thereof, means for setting a number in said digit carriage in a digit selective position and means for transmitting said digit selection to a series of sector gears having diameters proportionate with a series of ratchet gears, paired, respectively, with a series of pawl gears, having a ratchet and pawl between to carry the latter into rotation, the former being in mesh with said sector gears, the latter with accumulating gears, a series of total wheels in mesh with the accumulating wheels, mounted on a shaft with bearings in said case, having a digit band fastened to each with the ten digits marked thereon, equally spaced, with diameters proportionate so that said digits will synchronize with the angular movement of said sector gears and the predetermined digit selection of said digit starting members.

8. The combination of a case enclosing a calculating mechanism including digit starting members, computing members and recording members, the latter two arranged in a series of sets of operative members, each comprising one order, the digit starting members having digit keys to move transversely, one at a time, into operative position, the several digit levers mounted in a digit carriage, and, by means of a ratchet anchored to the latter, movable longitudinally step by step past said orders, concurrently with said transverse movement, to the range determined, a base upon which said case is mounted for movement in recessive and approach directions relative to said base, guide rods fastened to said base and tracks therefor provided in said case to hold them in position for said movement, lever connections between said case and said base to actuate said mechanism by said movement, equalizing levers and springs between said case and said base to effect the recessive movement thereof, means for setting a number in said digit carriage in a digit selective position and means for transmitting said digit selection to a series of sector gears having diameters proportionate with a series of determinate gears in mesh therewith and mounted on a shaft with bearings in said case, and a series of figure wheels fastened, severally, to said determinate gears, the latter having proportionate diameters to said sector gears, the former having figures marked thereon, equally spaced, with indents provided between, so that said indents and said figures will synchronize with the angular movement of said sector gears and the predetermined digit selection of said transmitting means.

9. The combination of a case enclosing a calculating mechanism including digit starting members, computing members and recording members, the latter two arranged in a series of sets of operative members, each comprising one order, the digit starting members having digit keys to move transversely, one at a time, into operative position, the several digit levers mounted in a digit carriage, and, by means of a ratchet anchored to the latter, movable longitudinally step by step past said orders, concurrently with said transverse movement, to the range determined, a base upon which said case is mounted for movement in recessive and approach directions relative to said base, guide rods fastened to said base and tracks therefor provided in said case to hold them in position for said movement, lever connections between said case and said base to actuate said mechanism by said movement, equalizing levers and springs to effect the recessive movement thereof, a digit shaft mounted in bearings in said case with a crank bar and lever connections to partially rotate the same, a tilting rod parallel to said shaft and mounted in arms keyed thereto, a digit carriage mounted thereon and movable along said shaft and rod and tiltable on said shaft by means of said rod when said shaft is partially rotated, a series of arcuately movable digit levers mounted therein on said shaft having ratchet bases with teeth spaced equally and an equal fraction of said arcuate movement, with a pawl engaging each to hold it in selective position by means of a reaction spring provided therefor, a release bar parallel to said shaft and rod, mounted in arms keyed to said rod, being positioned under said pawls and movable against them to release them from their ratchet bases, and a link bar with a link at one end operative over a pin fastened in an arm, the latter being keyed oppositely to said arms and a right angled link in the other end operative over a pin fastened to a latch bar, said link bar being the exact span of the tilting movement, so that said arm pin at the end of the tilting movement may actuate said release bar and force the same against said pawls, releasing them.

10. The combination of a case enclosing a calculating mechanism including digit starting members, computing members and recording members, the latter two arranged in a series of sets of operative members each comprising one order, the digit starting members having digit keys to move transversely, one at a time, into operative position, the several digit levers mounted in a digit carriage, and, by means of a ratchet anchored to the latter, movable longitudinally step by step past said orders, concurrently with said transverse movement, to the range determined, a base upon which said case is mounted for movement in recessive and approach directions relative to said base, guide rods fastened to said base and tracks therefor provided in said case to hold them in position for said movement, lever connections between said case and said base to actuate said mechanism by said movement, equalizing levers and springs to effect the recessive movement thereof, a digit shaft mounted in bearings in said case, having a crank bar keyed to said shaft and connections with a main actuating lever operative by said movement to partially rotate said shaft, a tilting rod parallel thereto and mounted in arms keyed to said shaft, a digit carriage mounted thereon and movable along said shaft and rod and tiltable on said shaft by means of said rod when said shaft is partially rotated, a series of arcuately movable digit levers mounted therein having ratchet bases with teeth spaced equally and an equal fraction of said arcuate movement with a pawl engaging each to hold it in selective position by means of a reaction spring provided therefor, and a latch bar anchored in said case, being operative by said main lever by contact therewith and engaging a catch provided in a connecting bar, the latter being actuated by spring tension stretched during said approach movement, attached thereto to draw said connecting bar away from said latch when said catch is released by said contact, said latch bar being actuated or tripped by said main lever by contact therewith during said tilting movement.

11. The combination of a case enclosing a calculating mechanism including digit starting members, computing members and recording members, the latter two arranged in a series of sets of operative members, each comprising one order, the digit starting members having digit keys to move transversely, one at a time, into operative position, the several digit levers mounted in a digit carriage, and, by means of a ratchet anchored to the latter, movable longitudinally step by step past said orders, concurrently with said transverse movement, to the range determined, a base upon which said case is mounted for movement in recessive and approach directions relative to said base, guide rods fastened to said base and tracks therefor provided in said case to hold them in position for said movement, lever connections between said case and said base to actuate said mechanism by said movement, equalizing levers and springs to effect the recessive movement thereof, means for setting a number in said digit levers in digit selective position and means for transmitting the same to a series of sector gears, a ratchet gear and a pawl gear, paired, with a ratchet and pawl between to carry the latter into rotation, said pawl gears being in mesh with accumulating wheels mounted on a shaft with bearings in said case, the former with said sector gears, said pairs being mounted on a shaft keyed to two parallel bars, one at each end of said shaft, fulcrumed on said accumulator shaft and movable to lift the ratchet gears out of the mesh with said sector gears, a lifting device mounted in duplicate, one member keyed at each end of a rod adjacent to the movable ends of said parallel bars and partially rotatable on said rod having jaws provided therein to engage a rod keyed to said parallel bars resting therein, and an incline fastened to said lifting device with the apex pointing towards said jaws, having a notch at its base and movable up and down when said rod is partially rotated to actuate said parallel bars and raise said ratchet gears out of the mesh with said sector gears.

12. The combination of a case enclosing a calculating mechanism including digit starting members, computing members and recording members, the latter two arranged in a series of sets of operative members each comprising one order, the digit starting members having digit keys to move transversely, one at a time, into operative position, the several digit levers mounted in a digit carriage, and, by means of a ratchet anchored to the latter, movable longitudinally step by step past said orders, concurrently with said transverse movement, to the range determined, a base upon which said case is mounted for movement in recessive and approach directions relative to said base, lever connections between said case and said base to actuate said mechanism by said movement, equalizing levers and springs to effect the recessive movement thereof, guide rods fastened to said base and tracks therefor provided in said case to hold them in position for said movement, means for setting a number in said digit levers and means for transmitting the same to a series of sector gears, a lifting device adjacent to the latter mounted in duplicate and movable to raise and restore to normal position a series of ratchet gears between the digit starting and computing members, having an incline fastened thereto, a series of protective bars secured to a rod adjacent to said sector gears and extending between the latter resting upon a pin riveted similarly in each and movable as one member when any sector gear is moved, and an arm keyed to said rod at right angles to said series and extending to the apex of said incline, the end of said arm being movable up said incline to the base thereof when said series is raised, where a notch is provided to hold said arm until said lifting device is actuated, said arm slipping off said incline by said actuation, resuming the normal position by means of a spring to hold said series against said pins.

13. The combination of a case enclosing a calculating mechanism including digit starting members, computing members and recording members, the latter two arranged in a series of sets of operative members, each comprising one order, the digit starting members having digit keys to move transversely, one at a time, into operative position, the several digit levers mounted in a digit carriage, and, by means of a ratchet anchored to the latter, movable longitudinally step by step past said orders, concurrently with said transverse movement, to the range determined, a base upon which said case is mounted for movement in recessive and approach directions relative to said base, guide rods fastened to said base and tracks therefor provided in said case to hold them in position for said movement, lever connections between said case and said base to actuate said mechanism by said movement, equalizing levers and springs to effect the recessive movement thereof, a digit carriage mounted on a shaft and tilting rod, movable along said shaft and rod and tiltable on said shaft by means of said rod when said shaft is partially rotated, said shaft having crankbar connections with a main actuating lever to tilt said digit carriage by said movement, the latter having digit levers mounted therein with ratchet bases and pawls engaging them to hold them in selective position for transmission by said movement to a series of sector gears, the latter in mesh with respective determinate gears and rotatable through an angular distance to synchronize with a series of figure wheels severally fastened to the latter, means for setting a number in said digit levers and means for releasing them, and a latch bar operative by said main lever to trip the same, releasing a connecting bar, the latter provided with a catch engaging said latch bar, the connecting bar being hinged to the short arm of a bellcrank arranged by connection of its longer arm to a tie bar, joined near the middle, with the ends attached to two alignment bars, one at either side of said figure wheels, positioned to engage indents provided therein between the ten digits marked thereon.

14. The combination of a case enclosing a calculating mechanism including digit starting members, computing members and recording members, a base upon which said case is mounted for movement relative to said base, lever connections between said base and said case to actuate said mechanism by said movement, guide rods fastened to said base and tracks therefor provided in said case to hold them in position for said movement, rest springs fastened to said base to hold said case in normal position, a digit carriage, with digit levers therein, mounted on a shaft and tilting rod, the latter mounted in arms keyed to said shaft, a main actuating lever joined to said shaft to tilt said digit carriage, a lifting device mounted on a rod adjacent to a series of sector gears, movable to connect and disconnect a series of ratchet gears operative between said digit starting and computing members, a latch bar operative under and by contact with said main lever by raising its latch from a catch provided in a connecting bar, the latter having a wire connection with an arm of said lifting device to actuate the latter, a bellcrank, the shorter arm joined to said connecting bar, the longer to bend a tie bar to draw two alignment bars together to engage indents provided in a series of figure wheels, and a tread lever with bearing in said case and operative between said case and said base, having three arms, one, the foot lever, extending below said case and actuated by contact with said base, one, the latch arm, even with and adjacent to said connecting bar, provided with a latch to engage a catch in said connecting bar, and one, the reaction arm, with a reaction spring to return the catch in said connecting bar to its latch in said latch bar during the recessive movement from said base to the top of said rest springs.

15. The combination of a case enclosing a calculating mechanism including digit starting members, computing members and recording members, a base upon which said case is mounted for movement relative to said base, guide rods fastened to said base and tracks therefor provided in said case to hold them in position for said movement, lever connections between said base and said case to actuate said mechanism by said movement, rest springs fastened to said base to hold said case in normal position, a digit carriage having digit levers mounted on a digit shaft, a tilting rod paralled to said shaft and mounted in arms keyed thereto, means for setting a number in said digit levers and means for releasing them, a series of sector gears mounted on a shaft with bearings in said case with means to actuate them to an angular distance to synchronize with the digit selection of the digit levers, in mesh with a series of ratchet gears and determinate gears, the former carrying a pawl gear by means of ratchet and pawl between to actuate a series of accumulating wheels, the latter respectively fastened to a series of figure wheels, having figures marked thereon and indents provided between to engage alignment bars adjacent thereto, a main lever connected by crank bar to tilt said digit carriage and operate a latch bar releasing a latch in a connecting bar, a lifting device movable to connect and disconnect said ratchet gears, having an arm with a wire connection to said connecting bar, means to actuate said releasing means, means to close said alignment bars into engagement with said indents, a tread lever operative by said base to reset said catch of said connecting bar into the latch of said latch bar by means of a latch of said tread lever operative in a second catch provided in said connecting bar, during recession from said base to the top of said rest springs, and a release hook secured to said base and extending into said case to disconnect the latch of said tread lever from the second catch in said connecting bar after the latch in said latch bar becomes engaged to the catch in said connecting bar during the remainder of said recession.

16. The combination of a case enclosing a calculating mechanism including digit starting members, computing members and recording members, the latter two arranged in a series of sets of operative members each comprising one order, the digit starting members having digit keys to move transversely, one at a time, into operative position, the several digit levers mounted in a digit carriage, and, by means of a ratchet anchored to the latter, movable longitudinally step by step past said orders, concurrently with said transverse movement, to the range determined, a base upon which said case is mounted for movement relative to said base, lever connections between said case and said base to actuate said mechanism by said movement, equalizing levers and springs to effect the recessive movement thereof, a main actuating lever to tilt said digit carriage and deliver a number into said mechanism, means for releasing the digit levers from the digit position set for said number, a differential lever operative over a resetting pin to return said digit carriage to normal position, a repeat rod with an outside key attached thereto and a link bar keyed to said rod and operative over said differential lever to raise the latter out of engagement with said pin and render it neutral, and by means of an arm keyed to said rod and pivotally joined by a connecting bar to said releasing means, movement of which actuating said link bar contemporaneously with said releasing means, the latter being provided with a rightangle link slot, a horizontal and a vertical slot, to engage a pin fastened in a latch bar contacting with said main lever and over which said horizontal link slot is operative to hold said releasing means to the range limit of said tilting movement and movable along said horizontal link slot by means of movement by said repeat rod in line with said vertical slot, thereby rendering the action of said releasing means and said differential lever neutral to effect the repetition of a number by said movement, and a shock spring to reduce the shock of said digit carriage during said approach movement.

17. The combination of a case enclosing a calculating mechanism including digit starting members, computing members and recording members arranged in a series of sets of operative members comprising one order, a base upon which said case is mounted for movement relative to said base, a pawl gear mounted in each order having a zero pin fastened therein to actuate a zero arm mounted loosely on a rod adjacent to said pawl gears, a leg rigid with said arm to which is hinged a connecting bar extending to a bar loosely mounted on a rod adjacent to said recording members, being automatic and selective in action and having lateral plates overlapping between orders provided on each bar to position the lower orders for engagement with indents provided in the recording members, an arc arm, actuated by total key connections, keyed to said rod and cooperative with said zero arm, having a catch to engage a latch in said leg, so that movement of said pin will position said loosely mounted bars near the recording members and latch said legs to said arc arms, said total key action being cumulative to move said recording members from the blank face to the position of naught provided thereon, and a selective connecting gear, suitably mounted and controlled in its selection by said connecting bar, selectively in mesh with a totalizing gear attached to each recording member and permanently in mesh with a retrograde gear, the latter in mesh with a pawl gear forming a train of wheels throughout the order, said train being provided in each order, so that the number accumulated in the total wheels may be transferred to the recording members, digit by digit in the orders selected, by retrograde movement of the total wheels, clearing the latter to the naught position, with the recording members moving normally from the naught position in response to the unison of gear action.

18. The combination of a case enclosing a calculating mechanism including digit starting members, computing members and recording members, the latter two arranged in a series of sets of operative members, each comprising one order, a base upon which said case is mounted for movement in recessive and approach directions relative to said base, lever connections between said case and said base to actuate said mechanism by said movement, a disconnecting key to actuate a lifting device mounted adjacent to two parallel bars carrying ratchet gears and pawl gears, paired, one pair to each order, mounted on a shaft keyed to said bars, a total key bar actuating a wedge plate, the latter having a link operative over a total wheel shaft against a collar keyed thereto adjacent to said wedge to thrust said shaft in its bearings against a spring provided thereon and thereby engaging clearing posts fastened to said shaft and positioned to meet stops attached to the inner side of digit bands secured to the total wheels, a gear mounted loosely on said shaft provided with a pawl to engage a ratchet wheel keyed to said shaft, said thrust movement engaging said gear with a sector gear, the latter having an arm to which said total key bar is joined and operative to turn said gear and clearing posts in retrograde directions, and an index at the right of the units order with lever connections attached to said total key bar, one being keyed to a rod extending to the vicinity of the units order where an arm keyed to said rod is operative to actuate an angle bar, fulcrumed at its angle to a pendent bar pivotally attached to the shaft of the recording members, the leg of said angle bar being hinged to a bar carrying said index to lower it for recording.

19. The combination of a case enclosing a calculating mechanism including digit starting members, computing members and recording members, the latter two arranged in a series of sets of operative members each set comprising one order, a base upon which said case is mounted for movement in recessive and approach directions relative to said base, lever connections between said case and said base to actuate said mechanism by said movement, equalizing levers and springs to effect the recessive movement thereof, guide rods fastened to said base and tracks therefor provided in said case to hold them in position for said movement, a total line provided in said case positioned above the hand rest thereof and beneath which the digits of a number accumulated to form a total are visible, a disconnecting key with means to render it effective to disconnect said digit starting members from said computing members, a series of pawl gears in each of said orders with automatic means for setting actuating levers to select and place in recording position as many naughts in the recording members as there are digits in the accumulated number, order for order, and means for indicating a total with an index at the right of the units order.

20. The combination of a case enclosing a calculating mechanism including digit starting members, computing members and recording members, the latter two arranged in a series of sets of operative members each comprising one order, a base upon which said case is mounted for movement in recessive and approach directions relative to said base, lever connections between said case and said base to actuate said mechanism by said movement, equalizing levers and springs to effect the recessive movement thereof, guide rods fastened to said base and tracks therefor provided in said case to hold them in position for said movement, a series of digit starting members, comprising a digit carriage with digit levers mounted therein and movable step by step to each order, setting each digit lever at the predetermined digit position of each digit of a number to transfer said number to said mechanism any arrangement of digits in any fundamental process of calculation by said movement, a series of computing members operative to receive actuations by said digit starting members by said movement and to express them by mechanical arrangement of digits visible from the outside of said case, and a series of recording members operative to receive actuations by said digit starting members simultaneously with said visible arrangement of digits by said movement, and with means to record said digits by said movement where desired.

As proof that I claim the foregoing I hereto affix my signature.

GEORGE F. WITTUM.